(12) United States Patent
Wickliffe et al.

(10) Patent No.: US 9,919,765 B2
(45) Date of Patent: Mar. 20, 2018

(54) SINGLE PIVOT FRONT DERAILLEUR

(71) Applicant: Wick Werks, LLC, Ogden, UT (US)

(72) Inventors: Christopher A. Wickliffe, Ogden, UT (US); Eldon L. Goates, Colorado Springs, CO (US)

(73) Assignee: Wick Werks, LLC, Ogden, UT (US)

( * ) Notice: Subject to any disclaimer, the term of this patent is extended or adjusted under 35 U.S.C. 154(b) by 14 days.

(21) Appl. No.: 14/215,213

(22) Filed: Mar. 17, 2014

(65) Prior Publication Data

US 2014/0274507 A1 Sep. 18, 2014

Related U.S. Application Data

(60) Provisional application No. 61/788,063, filed on Mar. 15, 2013.

(51) Int. Cl.
| | |
|---|---|
| *B62M 9/134* | (2010.01) |
| *B62M 9/1344* | (2010.01) |
| *B62M 9/1342* | (2010.01) |
| *B62M 9/136* | (2010.01) |

(52) U.S. Cl.
CPC ............ *B62M 9/134* (2013.01); *B62M 9/136* (2013.01); *B62M 9/1342* (2013.01); *B62M 9/1344* (2013.01)

(58) Field of Classification Search
CPC ...... B62M 9/1342; B62M 9/136; B62M 9/04; B62M 9/137; B62M 25/02
USPC .......................................................... 474/80
See application file for complete search history.

(56) References Cited

U.S. PATENT DOCUMENTS

| | | | | |
|---|---|---|---|---|
| 2,010,248 | A | * | 8/1935 | Winkler .......................... 474/80 |
| 2,590,975 | A | | 4/1952 | Juy |
| 3,121,575 | A | | 2/1964 | Bourgi |
| 3,890,847 | A | * | 6/1975 | Dian ............................... 474/80 |
| 4,237,743 | A | * | 12/1980 | Nagano .......................... 474/82 |
| 4,469,478 | A | * | 9/1984 | Weiss ............................. 474/80 |
| 4,599,079 | A | * | 7/1986 | Chappell ........................ 474/80 |

(Continued)

FOREIGN PATENT DOCUMENTS

| | | |
|---|---|---|
| CN | 1689902 A | 11/2005 |
| CN | 101264783 A | 9/2008 |

(Continued)

OTHER PUBLICATIONS

International Prelimnary Report on Patentability (Chapter I of the Patent Cooperation Treaty), International Application No. PCT/US2014/030180, with attachments, issued Sep. 15, 2015.

(Continued)

*Primary Examiner* — Henry Y Liu
(74) *Attorney, Agent, or Firm* — Taft Stettinius & Hollister LLP

(57) ABSTRACT

Embodiments of a front derailleur gear shifting system including various unique chain guides attached to and operating from a single pivot point. This derailleur system provides a simple, yet, elegant and robust improvement in shifting technique over conventional, lateral motion front derailleurs. Embodiments of open and closed annulus chain guides having specially shaped lifting and pulling surfaces for acting upon a bicycle chain during shifting are also disclosed. Additionally, as an optional enhancement, a dual-sided chain catcher that prevents unintended over-shifts in either direction is disclosed.

22 Claims, 21 Drawing Sheets

(56) References Cited

U.S. PATENT DOCUMENTS

| | | | |
|---|---|---|---|
| 4,734,083 A | 3/1988 | Nagano | |
| 4,887,990 A * | 12/1989 | Bonnard et al. | 474/78 |
| 5,002,520 A * | 3/1991 | Greenlaw | 474/140 |
| 5,460,576 A * | 10/1995 | Barnett | 474/144 |
| 5,607,367 A * | 3/1997 | Patterson | 474/80 |
| 5,624,336 A * | 4/1997 | Kojima | 474/82 |
| 5,728,018 A * | 3/1998 | Terada | B62M 9/1344 474/127 |
| 6,454,671 B1 * | 9/2002 | Wickliffe | 474/80 |
| 6,607,457 B2 * | 8/2003 | Kawakami | 474/80 |
| 7,011,590 B2 * | 3/2006 | Ichida et al. | 474/70 |
| 7,025,698 B2 * | 4/2006 | Wickliffe | 474/80 |
| 7,059,983 B2 | 6/2006 | Heim | |
| 7,258,637 B2 * | 8/2007 | Thomasberg | 474/78 |
| 7,361,109 B2 * | 4/2008 | Kilshaw | 474/81 |
| 7,722,489 B2 | 5/2010 | Tetsuka et al. | |
| 7,951,028 B2 * | 5/2011 | Wickliffe | 474/80 |
| 8,303,443 B2 * | 11/2012 | Wickliffe et al. | 474/80 |
| 8,556,757 B2 * | 10/2013 | Kilshaw | 474/81 |
| 2002/0061797 A1 | 5/2002 | Valle | |
| 2002/0177498 A1 | 11/2002 | Wickliffe et al. | |
| 2003/0064840 A1 * | 4/2003 | Kawakami | 474/70 |
| 2003/0096669 A1 * | 5/2003 | Kawakami | 474/80 |
| 2004/0005951 A1 * | 1/2004 | Tsai et al. | 474/80 |
| 2004/0009835 A1 | 1/2004 | Heim | |
| 2004/0102268 A1 * | 5/2004 | Valle | 474/80 |
| 2004/0127314 A1 * | 7/2004 | Nanko et al. | 474/80 |
| 2004/0166973 A1 * | 8/2004 | Nanko | 474/80 |
| 2005/0143206 A1 * | 6/2005 | Tetsuka et al. | 474/80 |
| 2005/0204846 A1 | 9/2005 | Valle et al. | |
| 2006/0019782 A1 * | 1/2006 | Wickliffe | 474/80 |
| 2006/0058131 A1 * | 3/2006 | Cooke | 474/78 |
| 2007/0135249 A1 * | 6/2007 | Nanko | 474/80 |
| 2008/0004142 A1 * | 1/2008 | Nakai et al. | 474/80 |
| 2010/0075788 A1 * | 3/2010 | Wickliffe et al. | 474/80 |
| 2011/0183795 A1 * | 7/2011 | Emura et al. | 474/80 |
| 2012/0157250 A1 | 6/2012 | Jordan | |

FOREIGN PATENT DOCUMENTS

| | | |
|---|---|---|
| CN | 202006866 U | 10/2011 |
| CN | 102530180 B | 7/2012 |
| EP | 0 519 405 A1 | 12/1992 |
| EP | 0 653 347 B1 | 5/1995 |

OTHER PUBLICATIONS

Chinese Patent Office, First Office Action Issued by State Intellectual Property Office (PCT Application Entering Into Chinese National Phase), dated Mar. 3, 2017, Patent App. No. 201480014013.2.

European Patent Office, Supplementary European search report and European search opinion in App. No. EP 14 76 3817, dated Oct. 14, 2016, Munich, Germany.

* cited by examiner

SINGLE PIVOT FRONT DERAILLEUR

CROSS-REFERENCE TO RELATED APPLICATIONS

This non-provisional patent application claims benefit and priority to the filing of U.S. Provisional Patent Application No. 61/788,063 filed on Mar. 15, 2013, titled "SINGLE PIVOT FRONT DERAILEUR AND DUAL-SIDED CHAIN CATCHER", the contents of which are incorporated by reference as if fully set forth herein.

BACKGROUND OF THE INVENTION

Field of the Invention

The present invention relates generally to bicycle components. More particularly, this invention relates to bicycle drive-train components. Still more particularly, this invention relates to a single pivot front derailleur and an optional dual-sided chain catcher that may be used with any front derailleur.

Description of Related Art

Most bicycles have multiple gears with front and rear derailleurs to change gears. A front derailleur is used to shift a bicycle chain between two or more chainrings of a crankset. A crankset typically includes two crank arms rotationally connected to a bottom bracket spindle at one end, and with pedals on opposite ends. Chainrings vary in diameter, each having a different number of teeth for engagement with the bicycle chain. The force required to turn the crankset is determined, in part, by the size of the particular chainring engaged by the bicycle chain. The size of the chainring can also determine the number of revolutions that will be required of the crankset in order to travel a certain distance. By changing the chain engagement from a chainring of one size to another, the bicyclist can strategically choose how much force will be required to be applied to the crankset, as well has how many revolutions the crankset will make in order to travel a relative distance.

Conventional bicycle frames are configured with a seat tube joined at one end to a down tube with a bottom bracket lug or shell. The bottom bracket lug supports the bottom bracket, typically consisting of the bottom bracket spindle, bearings, races, lock rings, spacers and the like, that are configured to couple with, and allow rotation of, the crankset. The opposite end of the seat tube conventionally supports a seat post and seat for the rider. A front derailleur is typically mounted on the seat tube of a bicycle frame and near the chainrings. Not all bicycle frames have a complete seat tube. For example, some full-suspension mountain bikes have a short seat tube stub for mounting a front derailleur that serves the purpose of a frame structural member for mounting the front derailleur. For simplicity of discussion, it will be assumed that the term, seat tube, denotes a full conventional seat tube or some other frame member, e.g., a short seat tube stub, for mounting the front derailleur.

A crankset attaches to opposite ends of a bottom bracket spindle. One arm of the crankset is simply a crank arm with a pedal designed to rotationally engage the bottom bracket spindle. The other arm of the crankset may include up to 3 chainrings supported on a crank arm spider to which a second pedal is attached. A front derailleur is necessary to shift the chain between the chainrings. The chainrings are typically arranged so as to be coaxial with, and parallel to, each other. The smallest chainring is typically closest to the bicycle frame with the chainrings progressively growing in diameter as they get further from the bike frame. The purpose of a conventional front derailleur is to urge the bicycle chain laterally away from the currently engaged chainring and towards a chainring selected by the rider through means of a properly connected shifting device also known as a shifter, typically using a derailleur cable under spring tension. Front derailleurs of various designs have been utilized to perform this function and most have similar features.

Construction and operation of a conventional front derailleur are described in U.S. Pat. No. 4,734,083 to Nagano. The Nagano front derailleur includes a member for fixing the front derailleur to the bicycle, a four pin linkage mechanism to effect a pantographic type movement of two guide members, the guide members typically being designated as the inner guide member and the outer guide member. When the assembly is activated to move away from the bicycle frame and toward a larger chainring, the inner guide pushes the bicycle chain laterally away from the bike frame until the bicycle chain leaves the currently engaged chainring and engages the next chainring. The action of urging the bicycle chain onto a larger chainring often involves the step of pressing the bicycle chain against the side of the larger chainring. By pressing the bicycle chain against the chainring, friction combines with the circular motion of the chainring to pull the bicycle chain up and onto the chainring. When the assembly is activated to move toward the bicycle frame and toward a smaller chainring, the outer guide urges the bicycle chain in a similar manner, with the outer guide pressing the bicycle chain off of the larger chainring, and then allowing the bicycle chain to fall onto the smaller chainring.

The inner and outer guides are spaced at a width which is wider than that of the bicycle chain, often one and a half to two times as wide as the bicycle chain. This allows the bicycle chain to run between the guides without contacting the guides while also allowing for some lateral movement of the bicycle chain which occurs when the bicycle chain is changed from one gear to another by a rear derailleur on a rear sprocket set also referred to as a cassette or cluster. The inner and outer guides each typically comprise a substantially flat elongated surface. The guides are placed substantially parallel to one another and are connected together with a front and rear link. An elongated spatial channel, often referred to as a cage is, thus, defined by the inner and outer guides and the front and rear links. The bicycle chain then passes through the cage without touching the inner and outer guides or the front and rear links during normal operation. There are typically multiple links of chain within the spatial area defined by the cage or chain guide at any given time.

It is possible for the bicycle chain to shift past the smallest inner chainring, especially when the inner chainring is very small. This can occur even on bikes adjusted by professional race mechanics. This inner chain derailment may result in the chain delivering no power to the rear wheel, or may get caught or tangled between moving parts, either of which is frustrating and potentially dangerous. Consequently, a small after-market of add-on products, called chain deflectors, exists to help prevent such inner derailments from occurring. Some of these conventional chain deflectors clamp around the seat tube, below the front derailleur, and at least one attaches to the front derailleur mount. However, such conventional chain deflectors do not appear to guard against an over-shift that would allow the chain to fall outside, or beyond the largest chainring.

The components of conventional front derailleurs may be constructed of any suitable materials, e.g., aluminum alloy, steel, plastic or carbon fiber composite. The pivot points used in links of the movement mechanism are usually bushings that generally require lubrication.

There are various cable pull types or configurations which can be used with shifting mechanisms of conventional front derailleurs to achieve movement of the chain guide. The bottom pull type is commonly used on road and touring bikes. The bottom pull type of derailleur is actuated by a cable pulling downwards relative to the location of the front derailleur. The cable in a bottom pull configuration is often routed across the top or along the bottom of the bottom bracket shell on a cable guide, which redirects the cable up the lower edge of the bicycle frame down tube. Full-suspension mountain bikes often have a bottom pull routing as the rear suspension hinders or prevents routing via the top tube of a bicycle frame.

The top pull cable configuration is more commonly seen on mountain bikes without rear-suspension. The front derailleur is actuated by a cable pulling upwards relative to the front derailleur, which is usually routed along the bicycle frame top tube, using cable stops and a short length of housing to change the cable's direction. This top pull configuration keeps the cable away from the underside of the bottom bracket and down tube which are subject to mud and dirt when off-road. Finally, there are some front derailleurs that are capable of either top pull or bottom pull and therefore can be used in either application.

Conventional front derailleurs are also capable of a couple different swing types depending on where the chain guide is mounted relative to the linkage or movement mechanism. In a bottom swing configuration, the derailleur chain guide is mounted to the bottom of the linkage mechanism, e.g., a four-link mechanism, which carries the chain guide. Alternatively, the front derailleur may be configured with a top swing configuration where the chain guide is mounted to the top of the movement mechanism. The top swing configuration was created as a way to get the frame clamp of the derailleur closer to the bottom bracket to be able to clear larger suspension components and allow different frame shapes. The compact construction of a top swing derailleur can cause it to be less robust than its bottom swing counterpart. Top swing front derailleurs are typically only used in applications where a bottom swing derailleur will not fit. And alternative solution would be to use an E-type front derailleur (discussed further below) which does not clamp around the seat tube at all.

Various approaches to securing a front derailleur to a bicycle frame member have been devised. The vast majority of front derailleurs are mounted to the frame by a clamp around the frame seat tube or its structural equivalent. Front derailleurs are available with several different clamp diameters designed to fit different types of frame tubing. Recently, there has been a trend to make front derailleurs with only one diameter clamp and then provide several sets of shims to space the clamp diameter down to the appropriate size of frame tubing.

An alternative to the clamp mounting mechanism is the braze-on derailleur hanger, where the front derailleur is mounted by bolting a tab on the front derailleur to a corresponding tab affixed to the bicycle frame seat tube by brazing, welding or other means. This braze-on mounting technique avoids any clamp size issues, but requires either a frame with the appropriate braze-on, or an adapter clamp that simulates a braze-on derailleur tab.

Alternatives to the clamp and braze-on mounting mechanisms include the E-type and direct-mount-derailleur (DMD) mounting mechanisms. The E-type front derailleur does not clamp around the frame seat tube, but rather is attached to the frame by a plate mounted under the drive side bottom bracket cup and a screw threaded into a boss on the seat tube. Such E-type front derailleur mounting mechanisms are usually found on mountain bikes with rear suspension components that do not allow space for a normal front derailleur clamp to go around the seat tube.

The DMD mounting mechanism, first introduced by Specialized Bicycles, employs a front derailleur bolted directly to bosses on a chainstay of the bicycle frame. The DMD configuration is typically used on dual suspension mountain bikes, where suspension movement causes changes to the chain angle as it enters the front derailleur cage. By utilizing a DMD system, the chain and derailleur move together during suspension travel, allowing for better shifting when the suspension is active.

Conventional chain guides, or front derailleur cages employ two parallel (inner and outer) plates that surround the bicycle chain and urge the chain laterally during shifting. The standard double cage type is intended to be used with cranksets having two chainrings. When viewed from the side, of the bicycle, the inner and outer plates of the double cage type have roughly the same profile. Alternatively, the alpine or triple cage type is used with front derailleurs designed to be used with triple cranksets having three chainrings, or with two chainrings that differ greatly in size (diameter). The alpine or triple cage type of chain guide employs a longer inner plate (relative to the outer plate) that extends further towards the bottom bracket's center of rotation. This longer inner plate helps to shift the chain from the smallest chainring onto the middle chainring more easily than with a standard double cage. In yet another approach to front derailleur cage design, U.S. Pat. Nos. 6,454,671 and 7,025,698 both to Christopher A. Wickliffe disclose annular chain guides.

In the evolution of front derailleurs, the conventional cable under spring tension with manual shift lever control has been replaced by electronic gear-shifting systems. An electronic gear-shifting system enables riders to shift with electronic switches instead of using conventional control levers. The switches are connected by electrical wire or wirelessly to a battery pack and to a small electric motor that drives the derailleur cage. However, such electronic gear-shifting systems generally employ the same four-link movement mechanism of most non-electronic shifting mechanisms.

Many conventional front derailleurs move a conventional chain guide, or derailleur cage, in an essentially lateral movement away from or toward the bicycle frame when shifting. On a properly adjusted front derailleur, the bicycle chain will only touch the chain guide during shifting. The chain guide is positioned by a movement mechanism, most commonly implemented using a four-link parallelogram mechanism to keep the chain guide properly aligned with the chain relative to the chainrings as the chain guide swings back and forth during shifting. There are usually two adjustment screws controlling the limits of lateral travel allowed. It is important to note that the conventional four-link, parallelogram mechanism moves the chain guide "laterally", i.e., left to right and vice versa, between chainrings.

Alternatives to the conventional four-link movement mechanism for front derailleurs are known. For example, a front derailleur employing linear movement of a front derailleur chain guide has been disclosed in U.S. Pat. Nos. 6,454,671 and 7,025,698 both to Christopher A. Wickliffe. Additionally, a six-link front derailleur mechanism is disclosed in U.S. Pat. No. 8,303,443 to Wickliffe et al.

While all of these conventional front derailleurs are capable of adequately shifting a front derailleur, each has its drawbacks. Generally speaking, there is little vertical movement associated with conventional front derailleur shifting, especially of the four-link design, even though there may be significant vertical disparity between adjacent chainrings. Additionally, there is essentially no fore and aft movement of the derailleur cage or rotational movement of a derailleur cage of conventional front derailleurs. Finally, conventional front derailleurs tend to be complicated because of the many mechanical links involved in the movement mechanisms. Accordingly, an improved front derailleur mechanism which addresses at least some of these drawbacks of the prior art would be desirable.

BRIEF SUMMARY OF THE INVENTION

An embodiment of a single pivot front derailleur for shifting a bicycle chain between a small chainring and a large chainring is disclosed. The embodiment of a front derailleur may include a mounting mechanism for structurally securing the front derailleur to a bicycle frame. The embodiment of a front derailleur may further include a movement mechanism connected to the mounting mechanism. The embodiment of a movement mechanism may further include an arm having a proximal end housing a single pivot. The arm may be configured to rotate about a single pivot in a plane of rotation. The plane of rotation may be at an acute angle relative to any vertical plane of the bicycle frame. The embodiment of a movement mechanism may further include a chain guide connected to a distal end of the arm. The chain guide may be configured for lifting up or pulling down on the bicycle chain during shifting.

An embodiment of a single pivot front derailleur for shifting a bicycle chain between a small chainring and a large chainring is disclosed. The embodiment of a front derailleur may include a mounting mechanism for securing the front derailleur to a bicycle frame structural member. The embodiment of a front derailleur may further include an arm rotationally connected to the mounting mechanism through a single pivot located at a proximal end. The embodiment of a front derailleur may further include a chain guide connected to a distal end of the arm. The chain guide and arm may be configured to selectively rotate about the single pivot in a direction forward or backward relative to the mounting mechanism during shifting.

An embodiment of a front derailleur for shifting a bicycle chain between a small chainring and a large chainring is disclosed. The embodiment of a front derailleur may include a chain guide having an upwardly and outwardly angled and contoured lifting surface and an inwardly and downwardly angled outer pulling surface for engaging the bicycle chain during up-shifts and down-shifts, respectively. The embodiment of a front derailleur may further include an arm connected at a distal end to the chain guide. The arm may house a pivot axis about which the distal end and the chain guide rotate about. The embodiment of a front derailleur may further include a mounting mechanism rotationally connected to the arm through a single pivot housing the pivot axis.

An embodiment of a dual-sided chain catcher adjustably connected to a mounting mechanism of a front derailleur is disclosed herein. The embodiment of the dual-sided chain catcher may include an inner guard and an outer guard. The inner guard may prevent the bicycle chain from falling inside the small chainring during down-shifts. The outer guard may prevent the bicycle chain from falling outside the large chainring during up-shifts.

Additional features and advantages of the invention will be apparent from the detailed description which follows, taken in conjunction with the accompanying drawings, which together illustrate, by way of example, features of embodiments of the present invention.

BRIEF DESCRIPTION OF THE SEVERAL VIEWS OF THE DRAWINGS

The following drawings illustrate exemplary embodiments for carrying out the invention. Like reference numerals refer to like parts in different views or embodiments of the present invention in the drawings. Where appropriate in the drawings, the environment in which the invention operates is generally shown in phantom with light or dashed lines to illustrate how the invention works with other features of a bicycle. For example, in FIGS. 1-7, the bicycle frame, crankset and bottom bracket that the front derailleur interacts with are all shown in phantom. However, the bicycle chain and derailleur cable are not shown in phantom.

FIG. 2 further illustrates an embodiment of an optional novel dual-sided chain catcher which may be attached to the front derailleur.

FIG. 5 further illustrates an embodiment of an optional novel dual-sided chain catcher which may be attached to the front derailleur.

In FIG. 15, the bicycle chain is running on the large chainring.

FIG. 20 shows the derailleur in the low shift position as it would be running on a small chainring (not shown). Similarly, FIG. 21 shows the derailleur in the high shift position as it would be running on a large chainring (also not shown).

FIG. 23 shows the derailleur in the low shift position as it would be running on a small chainring (not shown). Similarly, FIG. 24 shows the derailleur in the high shift position as it would be running on a large chainring (also not shown).

DETAILED DESCRIPTION OF THE INVENTION

Embodiments of a single-pivot front derailleur are described in this specification with reference to the drawings which illustrate features of the front derailleur and show its operation. As well-known to those of skill in the art, a front derailleur is a mechanism by which a bicycle chain may be shifted from one bicycle chainring to another bicycle chainring in order to change gears on a bicycle. The chainrings are connected to crank arms which in turn rotate about a spindle on bearings in a bottom bracket of a bicycle frame. The crank arms (not shown in any of the drawings) are connected to pedals (also not shown) which the bicycle rider operates to rotate the crankset and its chainrings in a forward rotation direction (see curved arrow R in FIG. 1) about the rotational axis of the bottom bracket.

Embodiments of a single pivot front derailleur are disclosed. The movement by way of a single pivot is believed to be novel and nonobvious over the prior art and provides a simple, yet, elegant and robust improvement in shifting over the prior art front derailleurs. More particularly, the rotational movement of the chain guide and arm fore and aft at a slight angle that closely follows the contours of the rotating chainrings is believed to be novel and nonobvious. The single pivot front derailleur includes any one of several chain guides or derailleur cages, closed annulus or open cage, having a saddle point within the annular region surrounding the bicycle chain for lifting the bicycle chain during an up-shift. The chain guides may also have an angled outer pulling surface for pulling down on the bicycle chain during a down-shift. Another novel feature is an optional dual-sided chain catcher that prevents unintended over-shifts in either direction. We begin our detailed description of the drawings by starting with an exploded view of one embodiment.

Figure 19:
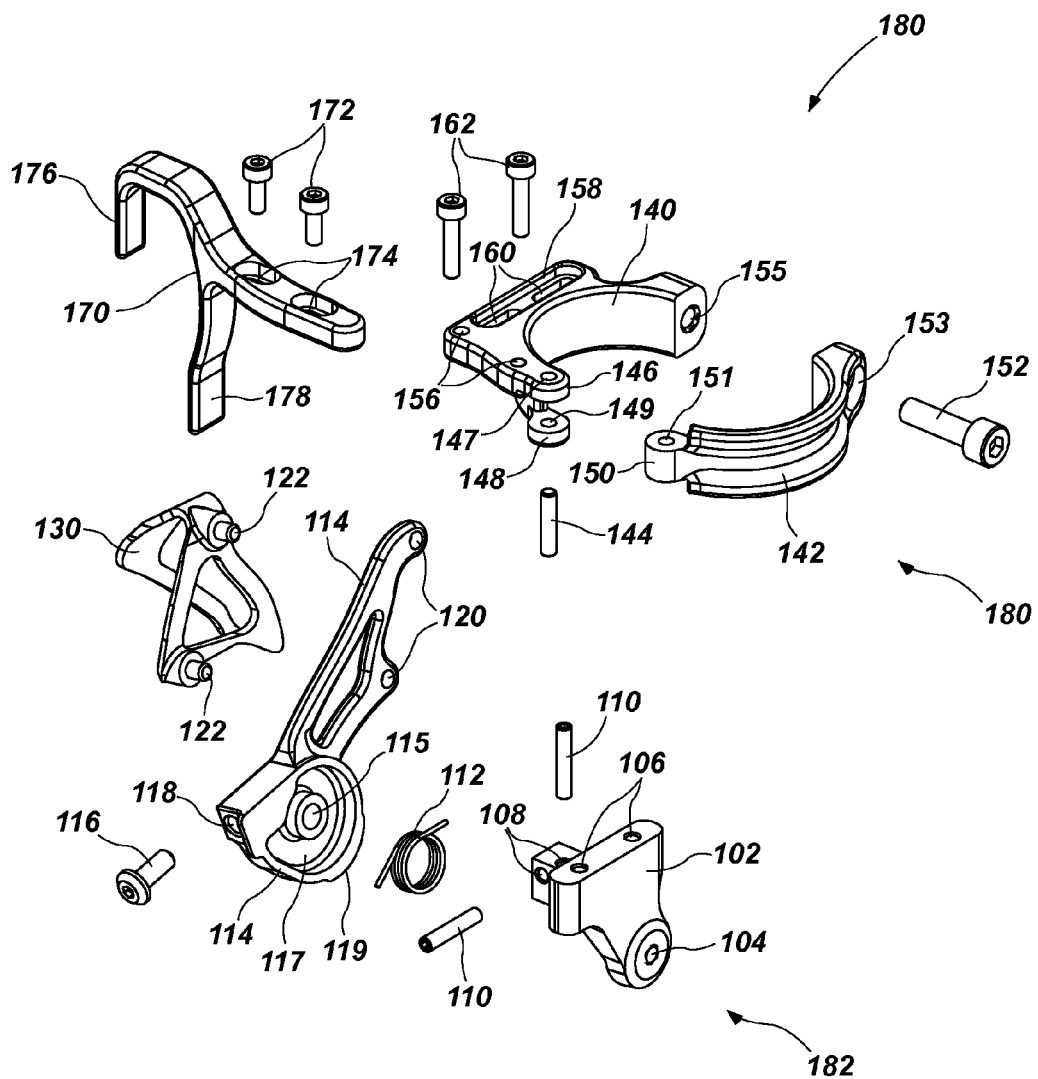
FIG. 19 is an exploded view of the components which may be assembled into an embodiment of a single pivot front derailleur with a dual-sided chain catcher shown in FIGS. 1-18, according to the present invention.

FIG. 19 is an exploded view of the components which may be assembled into a first embodiment of a single pivot front derailleur, shown generally at arrow 100, according to the present invention. Generally speaking front derailleur 100 includes a mounting mechanism shown generally at arrow 180 for securing the front derailleur 100 to a bicycle frame member (not shown) and a movement mechanism shown generally at arrow 182 for selectively shifting a bicycle chain (not shown) between chainring gears (not shown).

The movement mechanism 182 of front derailleur 100 may include a pivot bulkhead 102 that includes a pivot 104, mounting holes 106 (two shown), stop screw holes 108 (two shown) for receiving stop screws 110 (two shown). The pivot bulkhead 102 is configured to be rotationally connected to the arm 114 and enclose return spring 112 within recess 117 via pivot 104 connected to pivot axis 115. One novel and nonobvious feature of the front derailleur 100 is believed to be its single pivot 104 through pivot axis 115. That is to say that all movement of the movement mechanism 182 occurs as rotation around the single pivot 104 through pivot axis 115. Conventional front derailleurs typically have four or more pivot points.

Arm 114 of front derailleur 100 may further include a cable set screw 116 and cable set screw hole 118 for securing a derailleur cable (not shown) that is configured to wrap around the circular pivot housing 119. Arm 114 may also include cage mounting holes 120 for receiving cage mounts 122 of the first preferred chain guide 130. The first preferred chain guide 130 has an annular opening for receiving a bicycle chain (not shown in FIG. 19) therethrough and specially shaped inner surface features for interacting with the bicycle chain as further discussed herein.

The mounting mechanism 180 of front derailleur 100 may include an inner clamp 140 and corresponding outer clamp 142. The inner clamp 140 may further include an upper tang 146 having and upper tang hole 147 passing therethrough and an opposing lower tang 148 having lower tang hole 149 passing therethrough. The outer clamp 142 may include a middle tang 150 having a middle tang hole 151 passing therethrough. When the holes 147, 149 and 151 are aligned and coaxial a hinge bushing may be inserted therethrough to form a hinge between the inner clamp 140 and outer clamp 142. Inner 140 and outer clamp 142 are configured to surround a bicycle frame member, e.g., a seat tube or equivalent (not shown) and to be secured to that frame member via mounting bolt 152 passing through outer clamp mounting hole 153 and screwed into inner clamp mounting hole 155.

The inner clamp 140 may further include mounting recess 158 housing bulkhead slots 160. Using bulkhead screws 162, the movement mechanism 182 can be secured to the mounting mechanism 180 by mating with mounting holes 106 in the pivot bulkhead 102. Bulkhead slots 160 provide fore and aft adjustment of the movement mechanism 182 to accommodate various sized chainrings and for precise operation and shifting performance.

Inner clamp 140 may further include dual-sided chain catcher mounting holes 156 for mounting an optional dual-sided chain catcher 170. The dual-sided chain catcher 170 may include catcher mounting slots 174 for receiving catcher mounting bolts 172 which are configured to screw into the dual-sided chain catcher mounting holes 156 of the inner clamp 140. The catcher mounting slots 174 allow for lateral adjustment of the optional dual-sided chain catcher 170. The dual-sided chain catcher 170 includes outer 176 and inner guards 178 that are generally parallel to each other and configured to surround the bicycle chain (not shown) when running on either chainring (neither shown). The dual-sided chain catcher 170 is believed to be a novel feature of the single pivot front derailleur because it operates on both sides of a bicycle chain simultaneously and from over the top of the crankset (not shown). Chain deflectors are known in the art, but are believed to be limited to a single side of the set of chainrings, unlike catcher 170. The operational aspects and additional features of the embodiments of the single pivot front derailleur will now be discussed with reference to the other drawings.

The environment aspects in which the single pivot front derailleur 100 operates are generally shown in phantom in FIGS. 1-7 and 14-17, with the exception of bicycle chain 200 and derailleur cable 202 where they appear in the drawings. For example in FIGS. 1-7 the seat tube frame member 204, down tube frame member 206, bottom bracket or spindle 208, large chainring 210 and small chainring 212, are all shown generally in dotted line. By showing those environmental aspects in phantom, the novel and nonobvious features of derailleur 100 are more clearly illustrated, herein. Other aspects and components of a bicycle that are not shown in the drawings will be readily apparent to one of ordinary skill and need not be shown to describe the essential workings of derailleur 100, shown herein.

There are a number of features associated with the single pivot front derailleur 100 that distinguish it over conventional front derailleurs. For example, derailleur 100 moves with a single pivot rather than with multiple links, joints and/or arms. This simplicity in the movement mechanism 182 (FIG. 19) drastically increases stability and reduces complexity. Additionally, the chain guide 130 has surface features in different areas so that it interacts with the bicycle chain 200 differently depending on its orientation with respect to the pivot point 104. As seen in the various views, the bicycle chain 200 interacts with the front portion of the chain guide 130 when running on the small chainring 212, and interacts with the rear portion of the chain guide 130 when running on the larger chainring 210. The transition of the bicycle chain 200 and the active interaction points inside the annular opening of the chain guide 130 change during an up-shift as the bicycle chain 200 moves from the small chainring 212 to the larger chainring 210. Yet another novel feature is the anchor point of the derailleur 100 remains the same for different chainring set sizes. The arm 114 of the derailleur 100 may be adjusted outward or inward relative to the single pivot 104 to accommodate various size chainring sets according to one embodiment (see, e.g., U.S. Provisional Application No. 61/788,063, incorporated by reference herein, having arm 108 with multiple cage mounting holes shown in FIG. 18 and discussed at paragraph [0074]). The relative motion of the chain guide 130 with respect to the rotation of the chainrings 210 or 212 is unique to the single pivot front derailleur 100. This unique motion during an up-shift allows the chain guide 130 to follow the chain 200 and chainring 210 or 212 during its natural rotation R. Stated another way, the chain guide 130 follows the chainrings 210, 212 around their periphery rather than moving generally perpendicular to the planes of the chainrings, as conventional front derailleurs move. This unique motion includes pivoting about single pivot 104 in a plane that is generally parallel to the planes of rotation of the chainrings, except with a slight angle, a, (see, e.g., FIG. 4) allowing the chain guide 130 to move laterally outward slightly as it moves from the small chainring 212 position to the large chainring 210 position. This allows the annular space within the chain guide 130 to align, or center, with the position of the bicycle chain 200 running on those chainrings 210, 212. Finally, derailleur 100 and its unique chain guide 130 lift the bicycle chain 200 directly during an up-shift, rather than relying on the movement and upward rotation of the chainring 210 to do the lifting.

Figure 1:
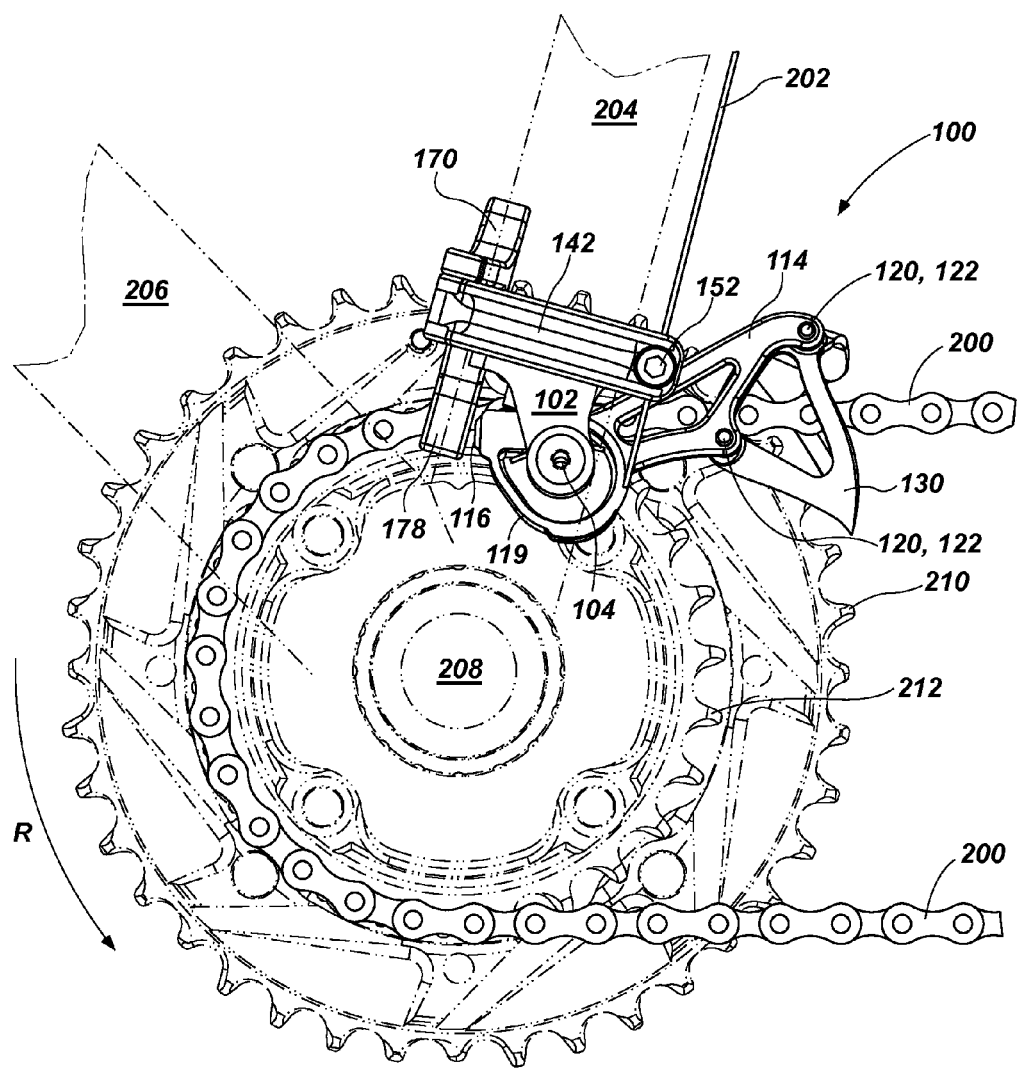
FIG. 1 is a left side view of an embodiment of single pivot front derailleur in low position according to the present invention.

FIG. 1 is a left side view of an embodiment of single pivot front derailleur shown generally at arrow 100 in low position according to the present invention. The low position is where the bicycle chain is running on the small chainring 212. Derailleur 100 is shown mounted to seat tube 204 and adjacent to large 210 and small 212 chainrings. Bicycle chain 200 passes through first preferred chain guide 130, which in turn, is connected to arm 114 with cage mounting holes 120 and cage mounts 122. FIG. 1 further illustrates outer clamp 142 secured by mounting bolt 152. Pivot bulkhead 102 with pivot 104 provides rotational support for arm 114. The circular pivot housing 119 is shown with derailleur cable 202 wrapped around and secured by cable set screw 116. FIG. 1 further illustrates the optional dual-sided chain catcher 170, particularly the inner guard 178 which prevents bicycle chain 200 from any further inward movement. The direction of forward crankset rotation is indicated by arrow R. Other structural features are also shown in phantom, namely the down tube 206 which joins the seat tube 204 at bottom bracket 208. The crankset axis of rotation is centered at bottom bracket 208. The front derailleur axis of rotation is centered at single pivot 104.

Figure 2:
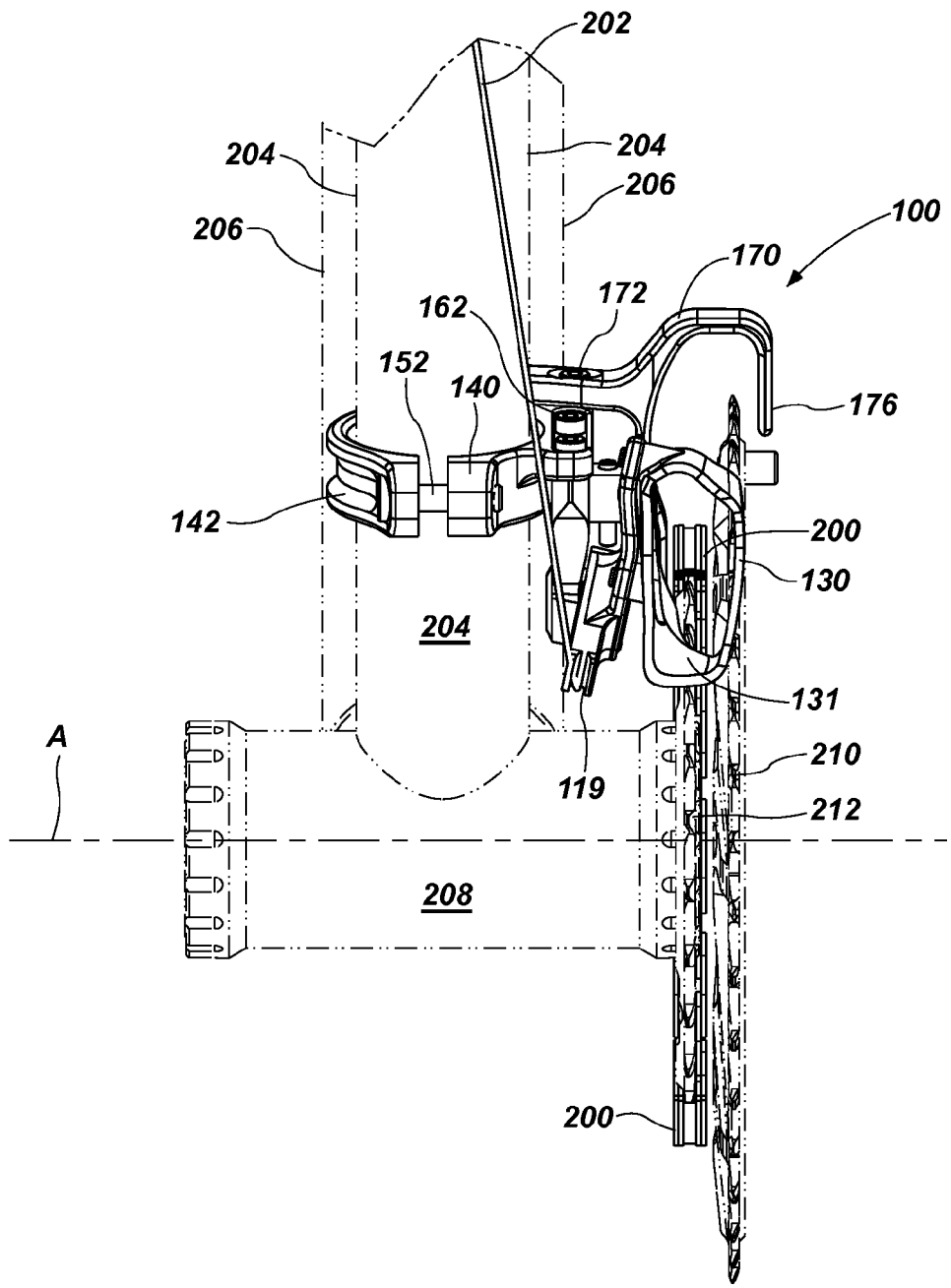
FIG. 2 is a rear view of the embodiment of a single pivot front derailleur according to the present invention shown in FIG. 1.

FIG. 2 is a rear view of the embodiment of a single pivot front derailleur 100 according to the present invention shown in FIG. 1. FIG. 2 further illustrates an embodiment of an optional novel dual-sided chain catcher 170 which may be attached to the front derailleur. FIG. 2 is particularly useful for illustrating the outer guard 176 of the dual-sided chain catcher 170 and how it prevents bicycle chain 200 from falling outside (to the right in FIG. 2) of the large chainring 210. The rear view of FIG. 2 also illustrates the angled lifting surface 131 along a saddle-like surface on the inner surface of chain guide 130. This angled lifting surface 131 is below the bicycle chain 200 in this view so it is seen clearly, but when shifting does occur (see FIG. 4 and related discussion below), this angled lifting surface 131 will contact the bicycle chain 200 actually lift the chain 200 from the corner of the chain 200 adjacent to surface 131, up off of the small chainring 212 during an up-shift. This is in marked contrast to conventional front derailleurs that only push laterally outward (to the right in FIG. 2) during up-shifts. FIG. 2 illustrates the mounting mechanism 180 (FIG. 19) comprising inner and outer clamps 140 and 142 secured by mounting bolt 152 around seat tube 204. A larger diameter down tube 206 is shown in phantom behind seat tube 204. Again, the seat tube 204 and down tube 206 join at bottom bracket 208, where an axis of crankset rotation A is shown in dashed line.

Figure 3:
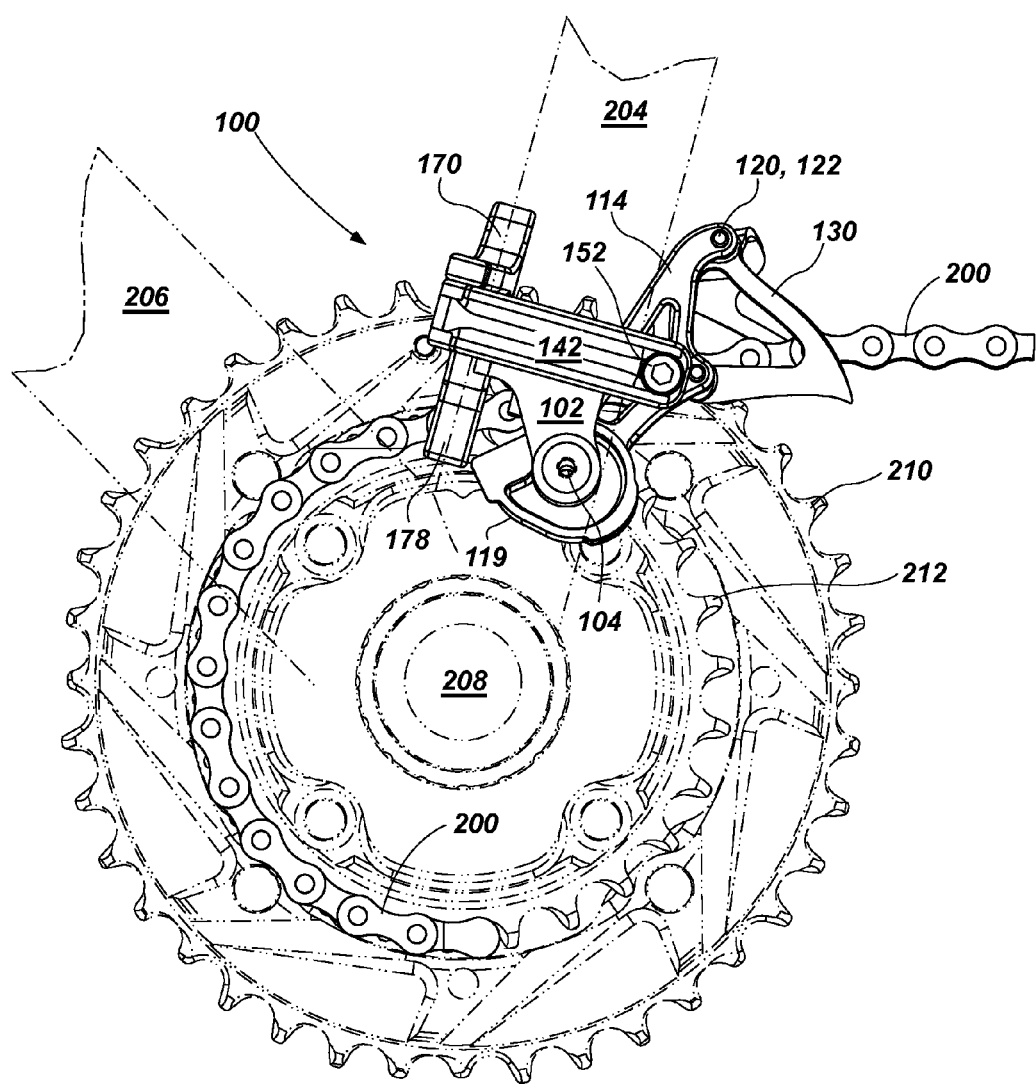
FIG. 3 is a left side view of the embodiment of a single pivot front derailleur shown in FIGS. 1-2, where the chain is in the process of being up-shifted from the small chainring to the large chainring.

FIG. 3 is a left side view of the embodiment of a single pivot front derailleur 100 shown in FIGS. 1-2, where the bicycle chain 200 is in the process of being up-shifted from the small chainring 212 to the large chainring 210. Relative to FIG. 1, it should be evident that arm 114 has rotated counterclockwise about the single pivot 104 in FIG. 3. This counterclockwise movement has engaged the angled lifting surface 131 (not shown, but see FIGS. 2 and 30-32) of the chain guide 130 to thereby lift the bicycle chain 200 during the up-shift. Note that derailleur cable 202 is not shown in FIG. 3 for clarity.

Figure 4:
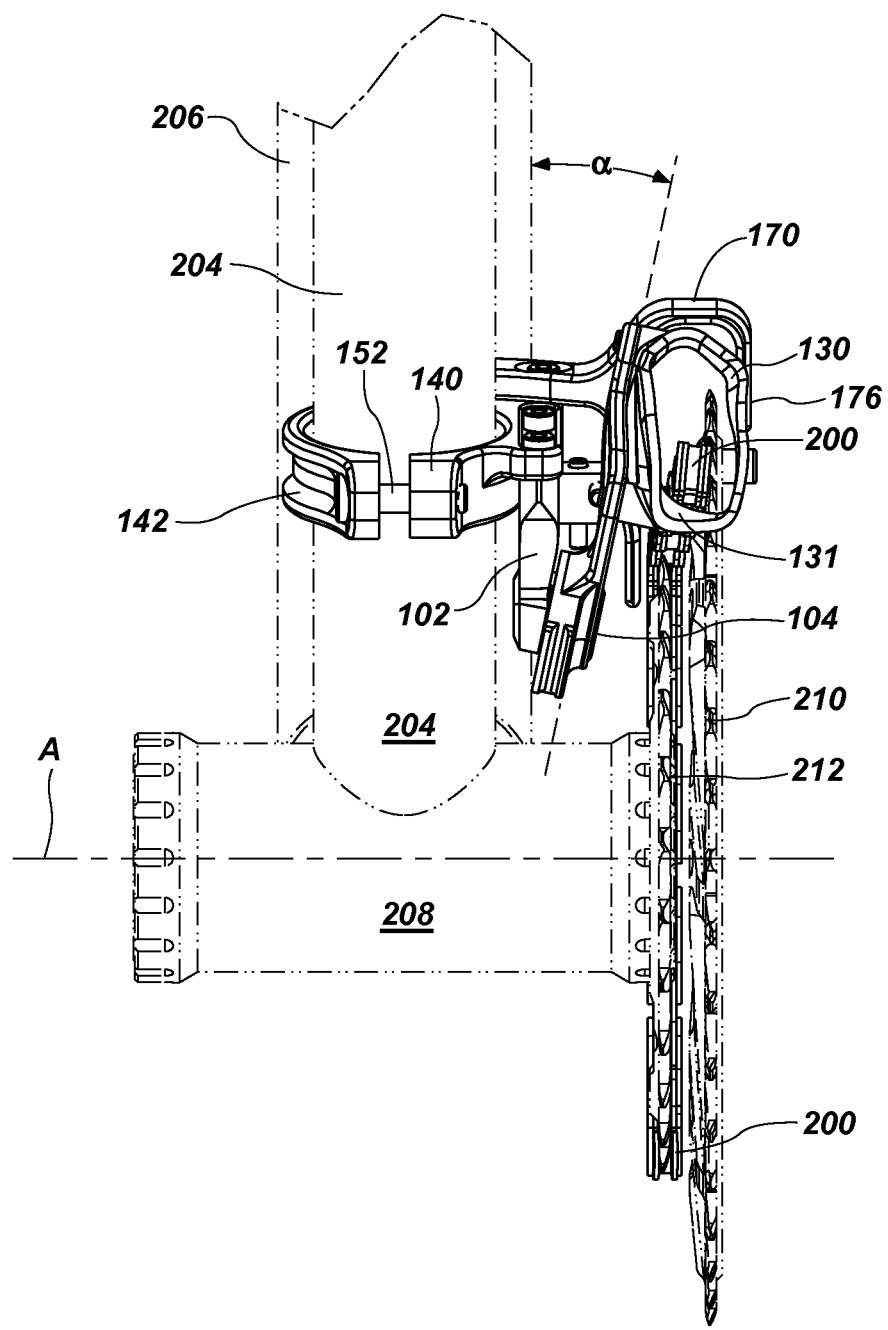
FIG. 4 is a rear view of the embodiment of a single pivot front derailleur shown in FIGS. 1-3 as the chain transitions from the small chainring to the large chainring.

FIG. 4 is a rear view of the embodiment of a single pivot front derailleur 100 shown in FIGS. 1-3 as the bicycle chain 200 transitions from the small chainring 212 to the large chainring 210. FIG. 4 best illustrates the saddle-like, angled lifting surface 131 as it engages and lifts bicycle chain 200 off of the small chainring 212. Note also that the rotational movement of the single pivot front derailleur 100 is not purely vertical but at an angle, a, relative to any vertical plane of the bicycle frame members (seat tube 204 and down tube 206). This angle, a, roughly tracks a tangent running through the tips of the teeth in the small chainring 212 to the tips of the teeth in the large chainring 210 as viewed from the rear as in FIG. 2 or 4, for example. The idea behind having some preselected angle, α, is to allow the chain guide 130 to more closely track the outer periphery of the chainrings, 210 and 212, and to follow the chain position as it moves from the small 212 to the large chainring 210. Other aspects of the derailleur 100 and its environment shown in FIG. 4 are similar to FIG. 2, except that derailleur cable 202 is again not shown for clarity of illustration.

Figure 5:
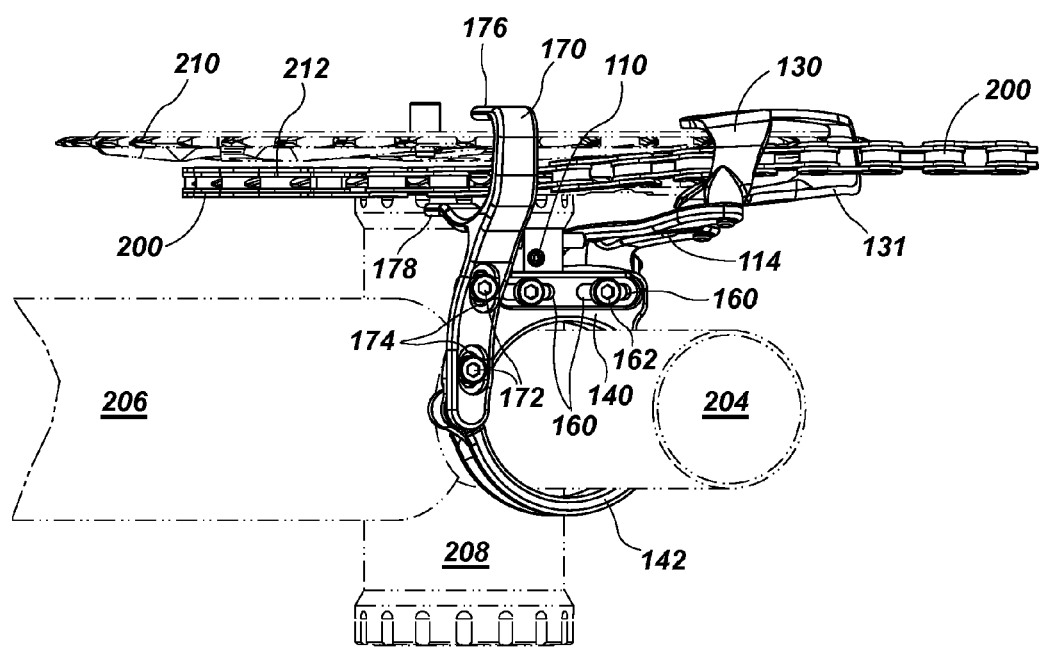
FIG. 5 is a top view of an embodiment of a single pivot front derailleur shown in FIGS. 1-4, as the bicycle chain transitions from the small chainring to the large chainring.

FIG. 5 is a top view of an embodiment of a single pivot front derailleur 100 shown in FIGS. 1-4, as the bicycle chain 200 transitions from the small chainring 212 to the large chainring 210. FIG. 5 further illustrates an embodiment of the optional dual-sided chain catcher 170 which may be secured to the front derailleur 100 using catcher mounting bolts 172. As shown in FIG. 5, the chain catcher 170 surrounds the chainrings 210 and 212 with outer and inner guards 176 and 178, respectively, thereby preventing the bicycle chain 200 from over-shifting to the outside or inside of the chainrings 210 and 212. Catcher mounting slots 174 allow for precise adjustment of the optional dual-sided chain catcher 170. Fore and aft adjustment of the movement mechanism 182 (FIG. 19), namely, the pivot bulkhead 102 (not shown), the arm 114 and chain guide 130 may also be achieved using the bulkhead screws 162 in bulkhead slots 160. Finally, FIG. 5 again illustrates the saddle-like angled lifting surface 131 on the inner surface of chain guide 130, which is shown in contact with the bicycle chain 200.

Figure 6:
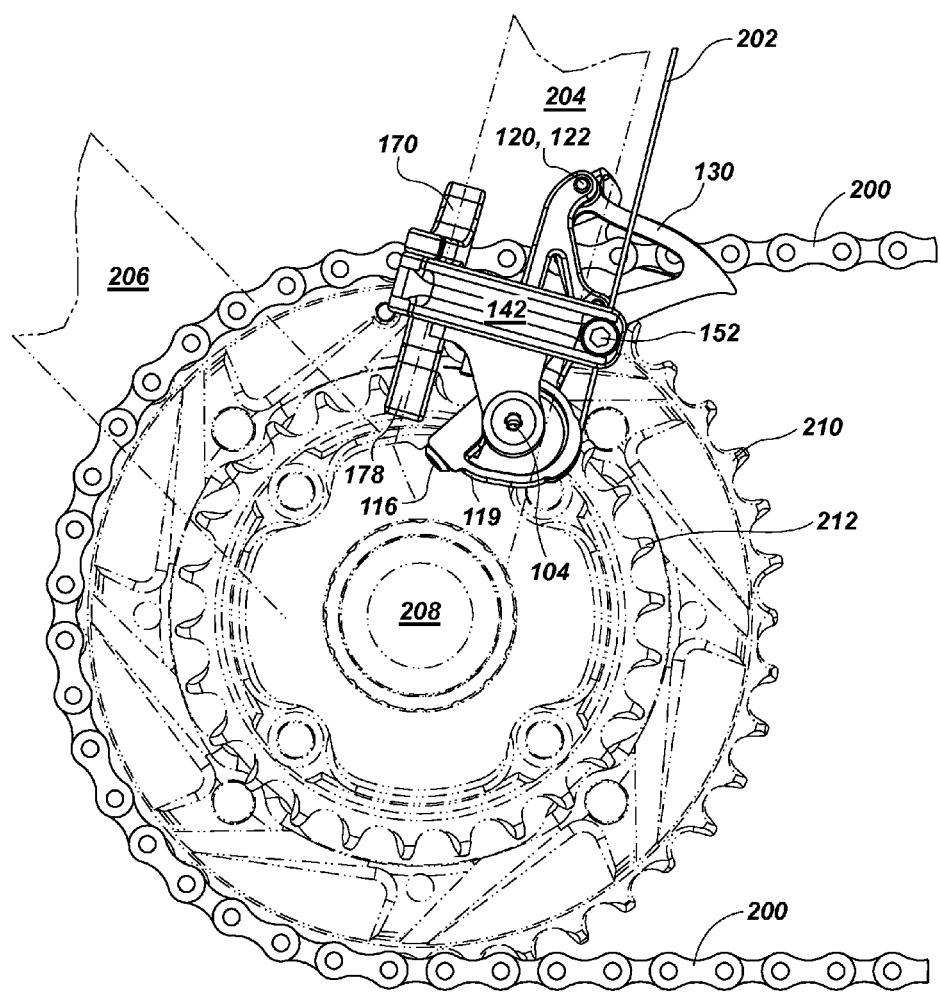
FIG. 6 is a left side view of the embodiment of a single pivot front derailleur shown in FIGS. 1-5, where the bicycle chain is running on the large chainring.

FIG. 6 is a left side view of the embodiment of a single pivot front derailleur 100 shown in FIGS. 1-5, where the bicycle chain 200 is running on the large chainring 210. The counterclockwise rotation of arm 114 and chain guide 130 about single pivot 104 of the derailleur 100 can be observed in the progression shown in FIGS. 1, 3 and 6 which illustrate a complete up-shift from the small chainring 212 to the large chainring 214. Note that FIG. 1 illustrates the low position, i.e., bicycle chain 200 running on the small chainring 212, whereas FIG. 6 illustrates the high position, i.e., bicycle chain 200 running on the large chainring 210. In the high position, the bicycle chain 200 passes freely through the chain guide 130 without touching it. This aspect is shown in FIG. 7.

Figure 7:
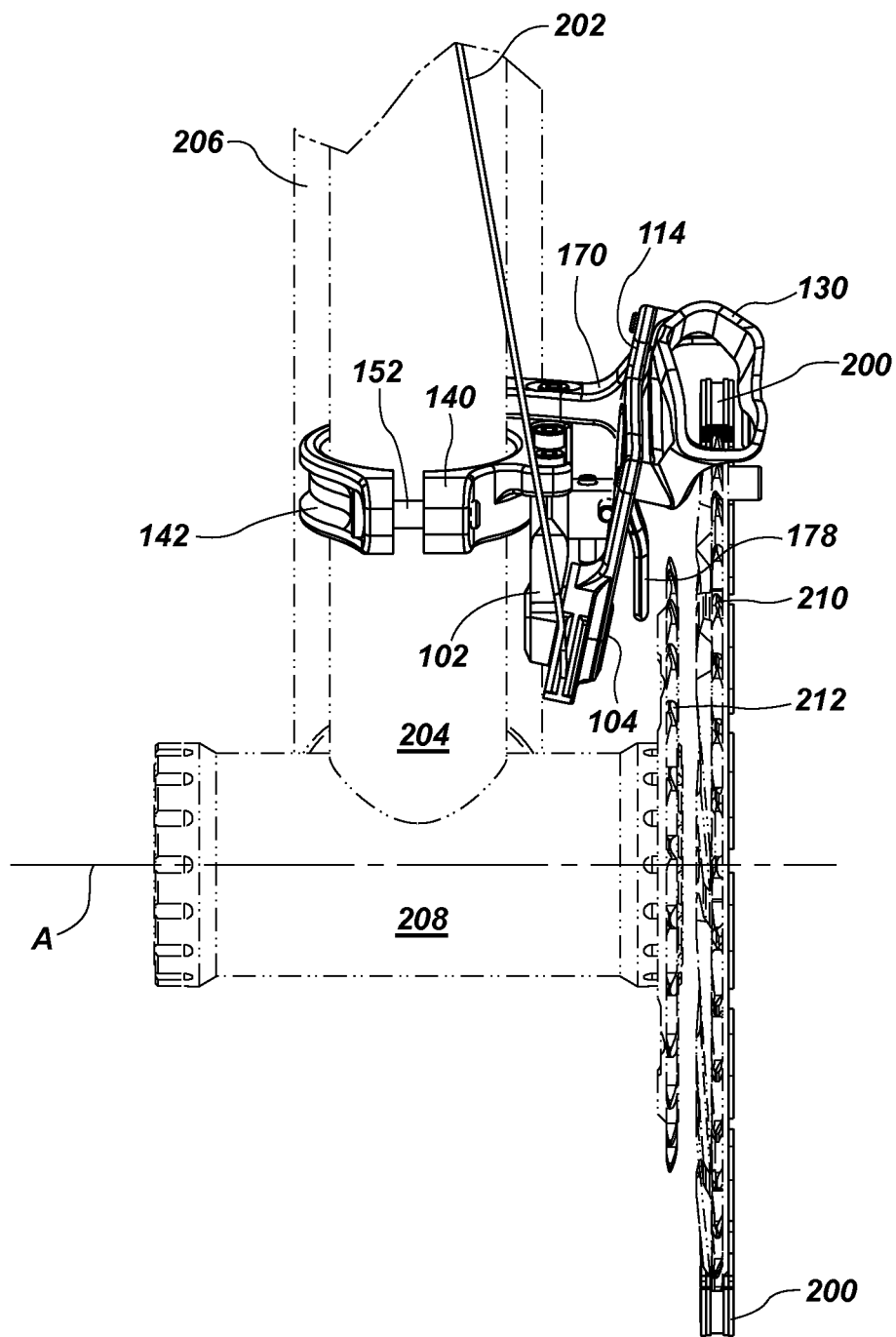
FIG. 7 is a rear view of the embodiment of the single pivot front derailleur shown in FIGS. 1-6, where the bicycle chain is running on the large chainring.

FIG. 7 is a rear view of the embodiment of the single pivot front derailleur shown in FIGS. 1-6, where the bicycle chain 200 is running on the large chainring 210 and centered within the annular opening of first preferred chain guide 130.

Figure 8:
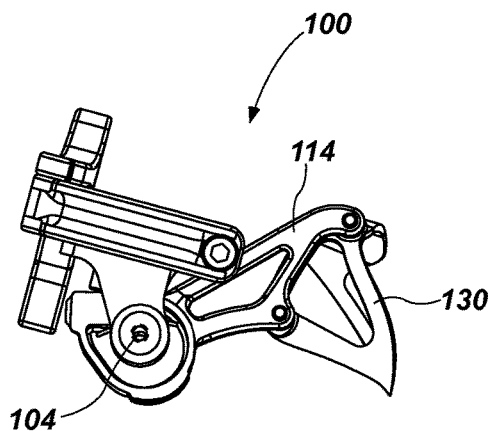
FIG. 8 is a side view of an embodiment of a single pivot front derailleur as shown in FIGS. 1-7, by itself and in the low position.
Figure 10:
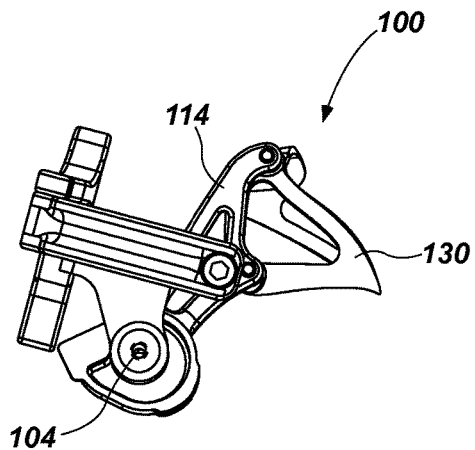
FIG. 10 is a left side view of the embodiment of a single pivot front derailleur as shown in FIGS. 1-9, by itself in between the low and high shift positions.
Figure 12:
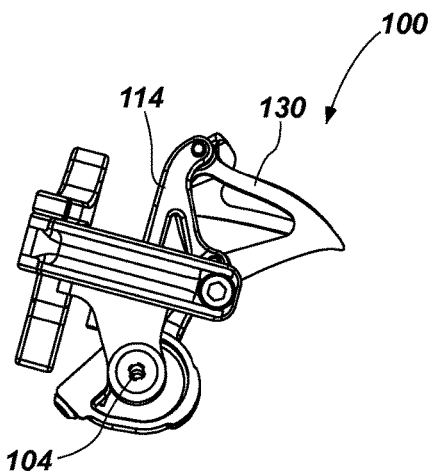
FIG. 12 is a left side view of the embodiment of a single pivot front derailleur as shown in FIGS. 1-11, by itself in the high shift position.

FIGS. 8, 10 and 12 are left side views of the embodiment of a single pivot front derailleur 100 all by itself without any environmental aspects included, but in each of three positions: FIG. 8 the low position, FIG. 10 an intermediate position (in between the low and high shift positions) and FIG. 12 the high position, respectively. This sequence of drawings (FIGS. 8, 10 and 12) clearly illustrate the rotation of arm 114 and chain guide 130 about single pivot 104 during and up-shift (or in the reverse, a down-shift). Again, this rotational movement of the chain guide 130 from the back (FIG. 8) toward the front (FIG. 12) of a bicycle (not shown) is a unique and novel feature of single pivot front derailleur 100.

Figure 9:
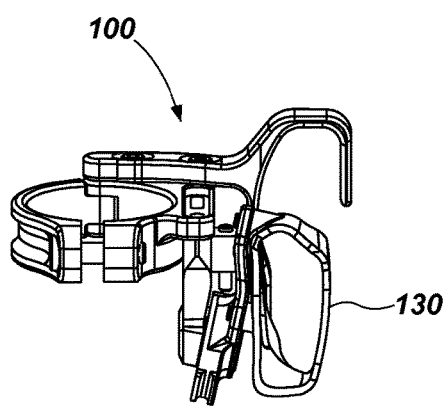
FIG. 9 is a rear view of the embodiment of single pivot front derailleur in the low position shown in FIG. 8.
Figure 11:
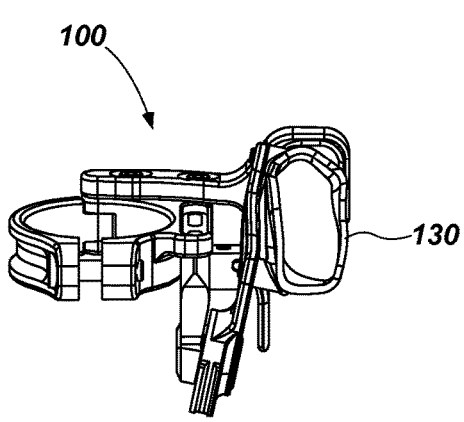
FIG. 11 is a rear view of the embodiment of a single pivot front derailleur between the low and high shift positions shown in FIG. 10.
Figure 13:
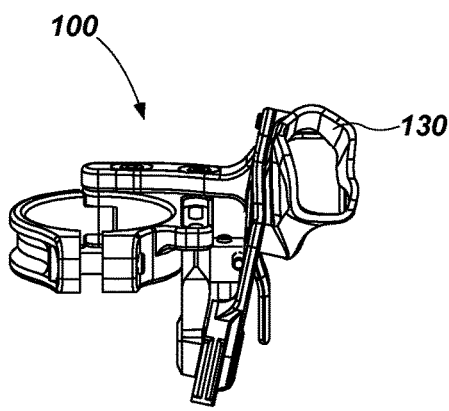
FIG. 13 is a rear view of the embodiment of a single pivot front derailleur in the high shift position shown in FIG. 12.

FIGS. 9, 11 and 13 are rear views of the embodiment of single pivot front derailleur 100 all by itself without any environmental aspects included, but also in each of three positions: FIG. 9 the low position, FIG. 11 an intermediate position (in between the low and high shift positions) and FIG. 13 the high position, respectively. This sequence of drawings (FIGS. 9, 11 and 13) clearly illustrate the upward and slightly outward (recall angle, a, FIG. 4) movement of the chain guide 130 relative to the bicycle (not shown) which remains stationary in all three FIGS. 9, 11 and 13.

Figure 14:
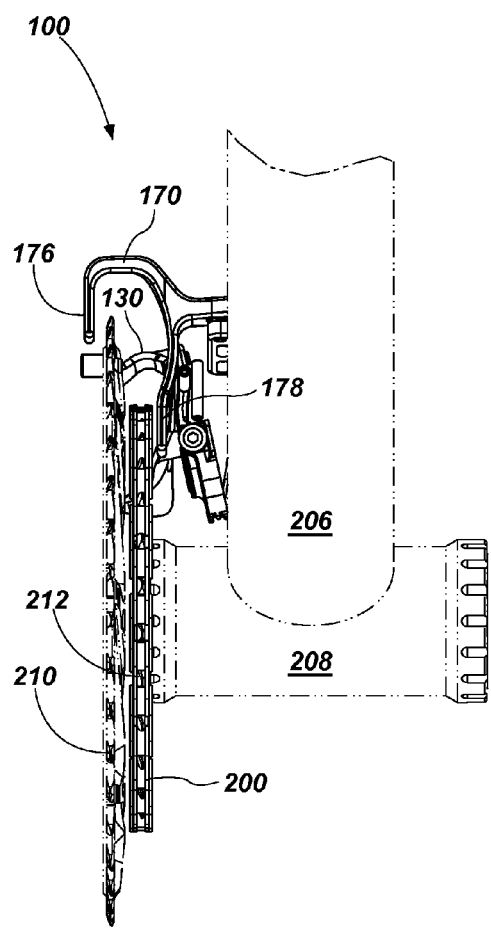
FIGS. 14 and 15 are front views of the embodiment of a single pivot front derailleur with dual-sided chain catcher shown in FIGS. 1-13. More particularly, in FIG. 14 the bicycle chain is running on the small chainring.
Figure 15:
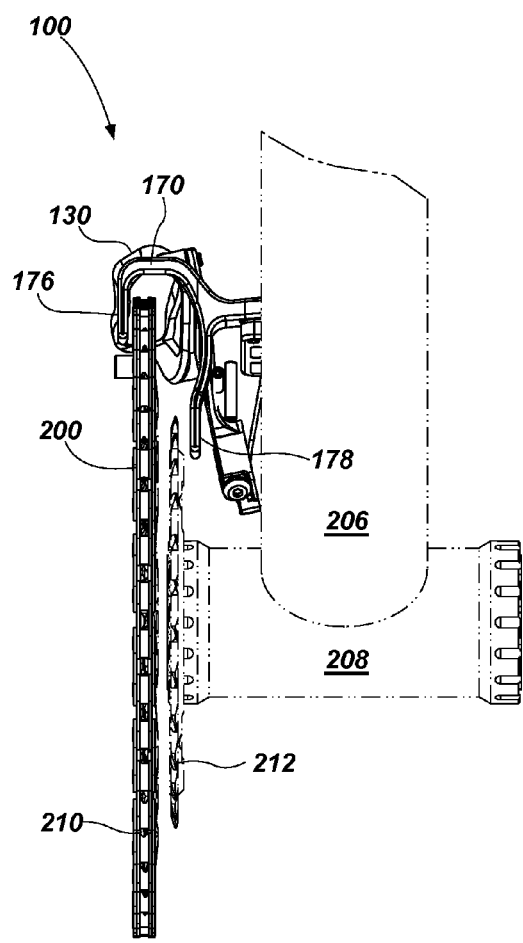

FIGS. 14 and 15 are front views of the embodiment of a single pivot front derailleur 100 with dual-sided chain catcher 170 shown in FIGS. 1-13. More particularly, in FIG. 14 the bicycle chain 200 is running on the small chainring 212. Note also that inner guard 178 of the dual-sided chain catcher 170 is near to, but spaced away from, bicycle chain 200 on the side closest to the down tube 206 and will therefore prevent the bicycle chain 200 from going any closer to the down tube 206.

In FIG. 15, the bicycle chain 200 is running on the large chainring 210. As shown in FIG. 15, the outer guard 176 of the dual-sided chain catcher 170 is near to, but spaced away from, bicycle chain 200 on side furthest away from the down tube 206. The outer guard 176 will prevent the bicycle chain 200 from falling outside of the large chainring 210. Note also that the mounting mechanism (see arrow 180 in FIG. 19) is largely obscured by the down tube 206 in the front views of FIGS. 14 and 15.

Figure 16:
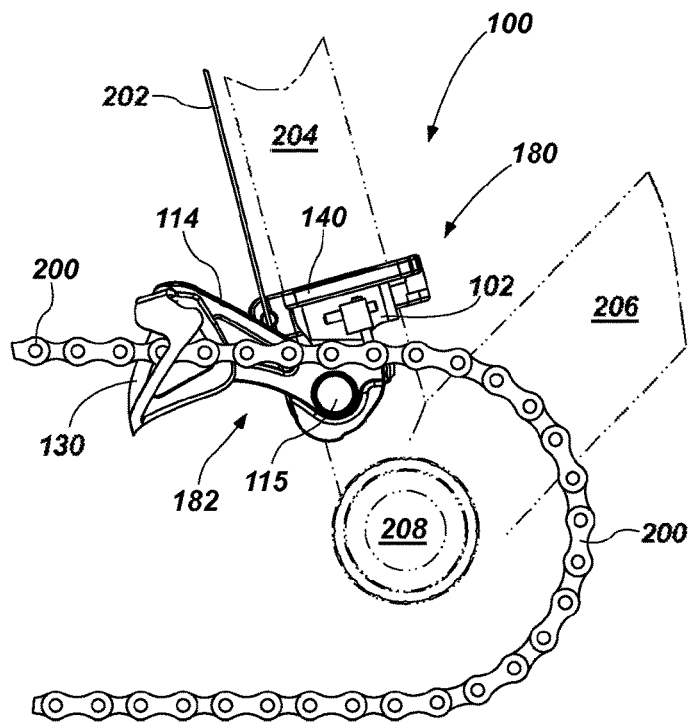
FIGS. 16 and 17 are right side views of the embodiment of a single pivot front derailleur shown in FIGS. 1-15, without the dual-sided chain catcher, illustrating the positioning of the derailleur and chain guide as if the chain were running on small and large chainrings (not shown), respectively, according to the present invention.
Figure 17:
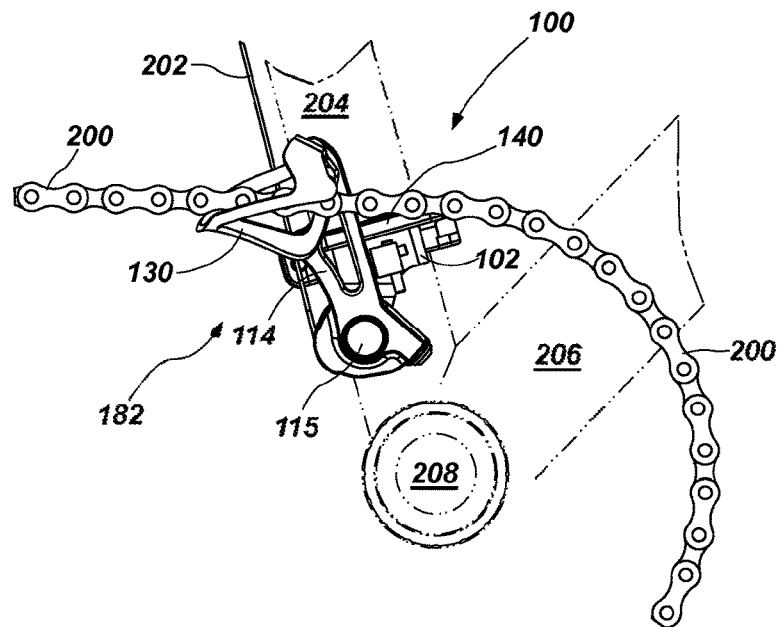

FIGS. 16 and 17 are right side views of the embodiment of a single pivot front derailleur 100 shown in FIGS. 1-15, but, without the optional dual-sided chain catcher 170. FIGS. 16 and 17 illustrate the positioning of the movement mechanism, shown generally at arrow 182, but more particularly, arm 114 and first preferred chain guide 130 as if the bicycle chain 200 were running on the small 212 and large chainrings 210 (not shown), respectively, according to the present invention. The mounting mechanism, shown generally at arrow 180 (FIG. 16) includes inner clamp 140. FIG. 16 illustrates the single pivot front derailleur 100 in the low shift position, i.e., bicycle chain 200 running on the small chainring 212 (not shown). FIG. 17 illustrates the single pivot front derailleur 100 in the high shift position, i.e., bicycle chain 200 running on the large chainring 210 (not shown).

Figure 18:
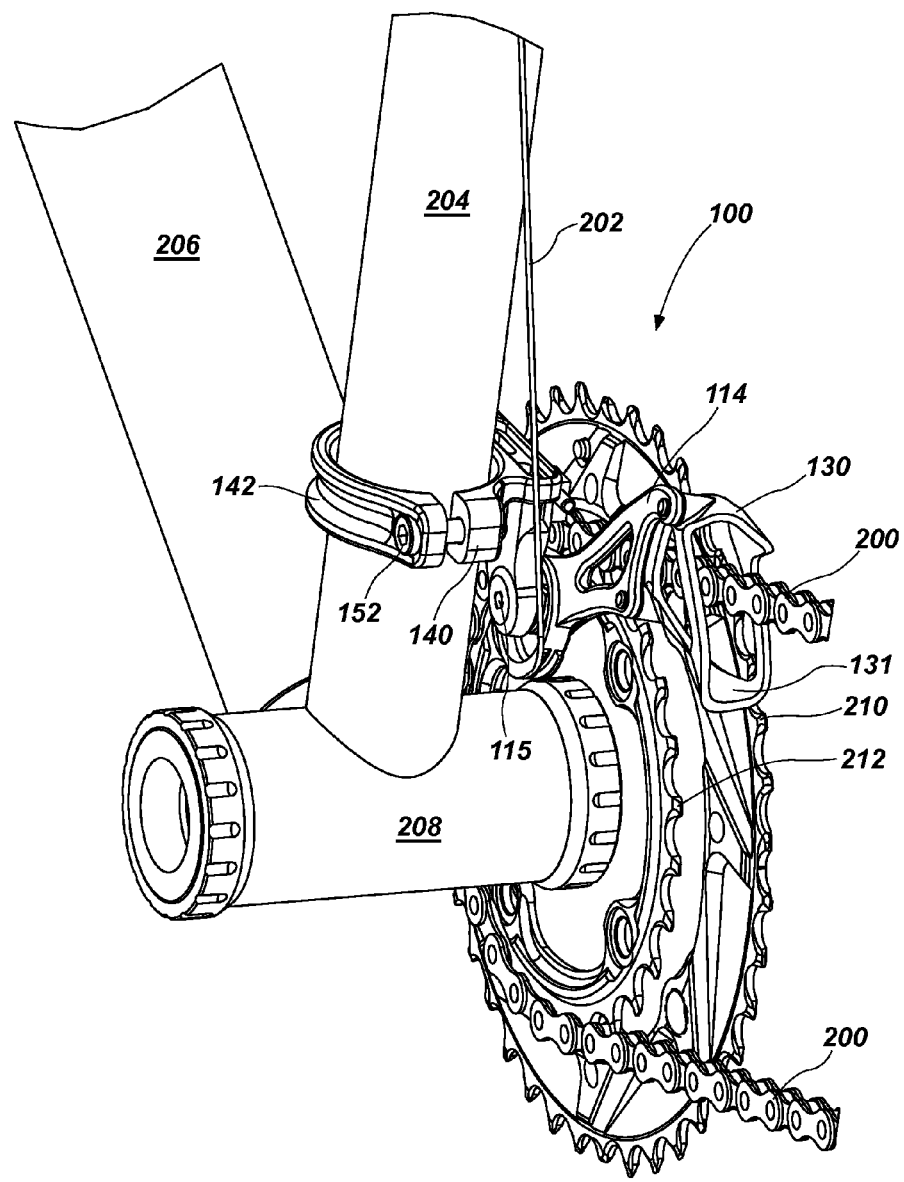
FIG. 18 is a rear perspective view of the embodiment of a single pivot front derailleur shown in FIGS. 1-17 without the dual-sided chain catcher.

FIG. 18 is a rear perspective view of the embodiment of a single pivot front derailleur 100 shown in FIGS. 1-17 without the optional dual-sided chain catcher 170. The environment (seat tube 204, down tube 206, bottom bracket 208 and large and small chainrings 210 and 212) in which the derailleur 100 operates are also shown in FIG. 18 without the phantom (dotted or dashed) lines used, e.g., in FIGS. 1-7. In FIG. 18, the single pivot front derailleur 100 is in the low shift position, i.e., bicycle chain 200 running on the small chainring 212 and passing through the annular opening of the chain guide 130. Rotation of arm 114 occurs at pivot axis 115.

While single pivot front derailleur 100 has been illustrated with first preferred chain guide 130, other chain guide configurations are also suitable. For example, the annular chain guides disclosed in U.S. Pat. Nos. 6,454,671 and 7,025,698 both to Christopher A. Wickliffe, U.S. Pat. No. 8,303,443 to Wickliffe et al. and U.S. Provisional Patent Application No. 61/788,063 also to Wickliffe et al. could be adapted for use with the single pivot front derailleurs 100, 300 and 400 disclosed herein. Other preferred embodiments of a chain guide for use with the embodiments of the single pivot front derailleurs 100, 300 and 400 are disclosed below.

Figure 20:
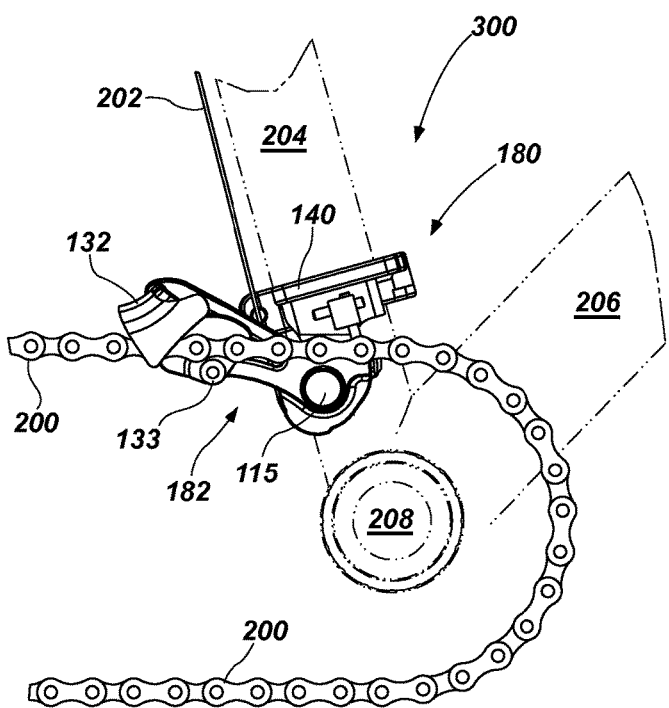
FIGS. 20-21 are right side views illustrating another embodiment of a single pivot front derailleur featuring a second preferred chain guide and without the optional dual-sided chain catcher. More particularly.
Figure 21:
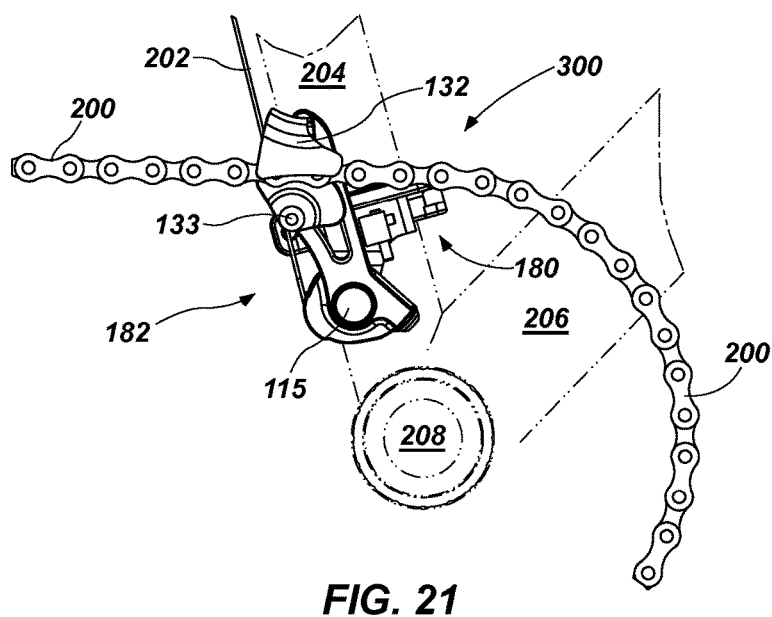

FIGS. 20-21 are right side views illustrating a second embodiment of a single pivot front derailleur 300 featuring a second preferred chain guide 132 and without the optional dual-sided chain catcher 170, according to the present invention. Derailleur 300 is similar to derailleur 100, except for replacing first preferred chain guide 130 for second preferred chain guide 132. More particularly, FIG. 20 shows the derailleur 300 in the low shift position, i.e., with bicycle chain 200 running on a small chainring 212 (not shown). Similarly, FIG. 21 shows the derailleur 300 in the high shift position, i.e., with bicycle chain 200 running on a large chainring 210 (also not shown).

The configuration of the second preferred chain guide 132 is different from the first preferred chain guide 130 shown in FIGS. 1-19. Chain guide 132 does not have a closed annulus like chain guide 130. Rather, it has an open cage design that allows easier servicing because the bicycle chain 200 does not have to be broken to remove the front derailleur 300 from the bicycle. The open cage design of chain guide 132 is also believed to be distinctive over the prior art because it does not have a closed annulus. The open cage design further allows the chain guide 132 to operate very close to the chainrings 210 and 212 without touching them. This open cage feature of chain guide 132 allows precise chain placement on the chainrings 210 and 212 for fast shifting. This open cage feature of chain guide 132 maintains the bicycle chain 200 in the proper location while tracking the perimeter of each chainring 210 and 212. By closely tracking the perimeter of each chainring 210 and 212, there is not enough space for the bicycle chain 200 to jump out between the large chainring 210 and portions of the chain guide 132 cage.

Another distinctive feature of the second preferred chain guide 132 of single pivot front derailleur 300 is a truncated lifting cone 133 feature formed on the inside surface of chain guide 132. While cone 133 is shown as a generally round conical feature in the drawings FIGS., it will be appreciated that only a partial cone feature will perform the same function, i.e., the cone shape does not need to go all the way around. For example and not by way of limitation, surface 131 of the first preferred chain guide has a roughly conical lifting surface that does not make a complete circle. So, the term "truncated lifting cone" as used herein reflects these variations in a conical lifting surface that achieve the bicycle chain lifting effect described and shown herein. The truncated lifting cone 133 forms an outwardly tapered surface used to lift and bias the bicycle chain 200 toward the large chainring 210 during an up-shift. The raised portion and angle of action of the truncated lifting cone 133 persists even as the second preferred chain guide 132 and movement mechanism 182 rotate about single pivot 104 and axis 115 during an up-shift. The shape and angle of the truncated lifting cone 133 are carefully selected to obtain direct and quick action promoting the up-shift. The function of truncated lifting cone 133 is analogous to the function of saddle-like, angled lifting surface 131 of the first preferred chain guide 130 discussed above. Additional features relating to truncated lifting cone 133 are explained below with respect to additional drawings.

Figure 22:
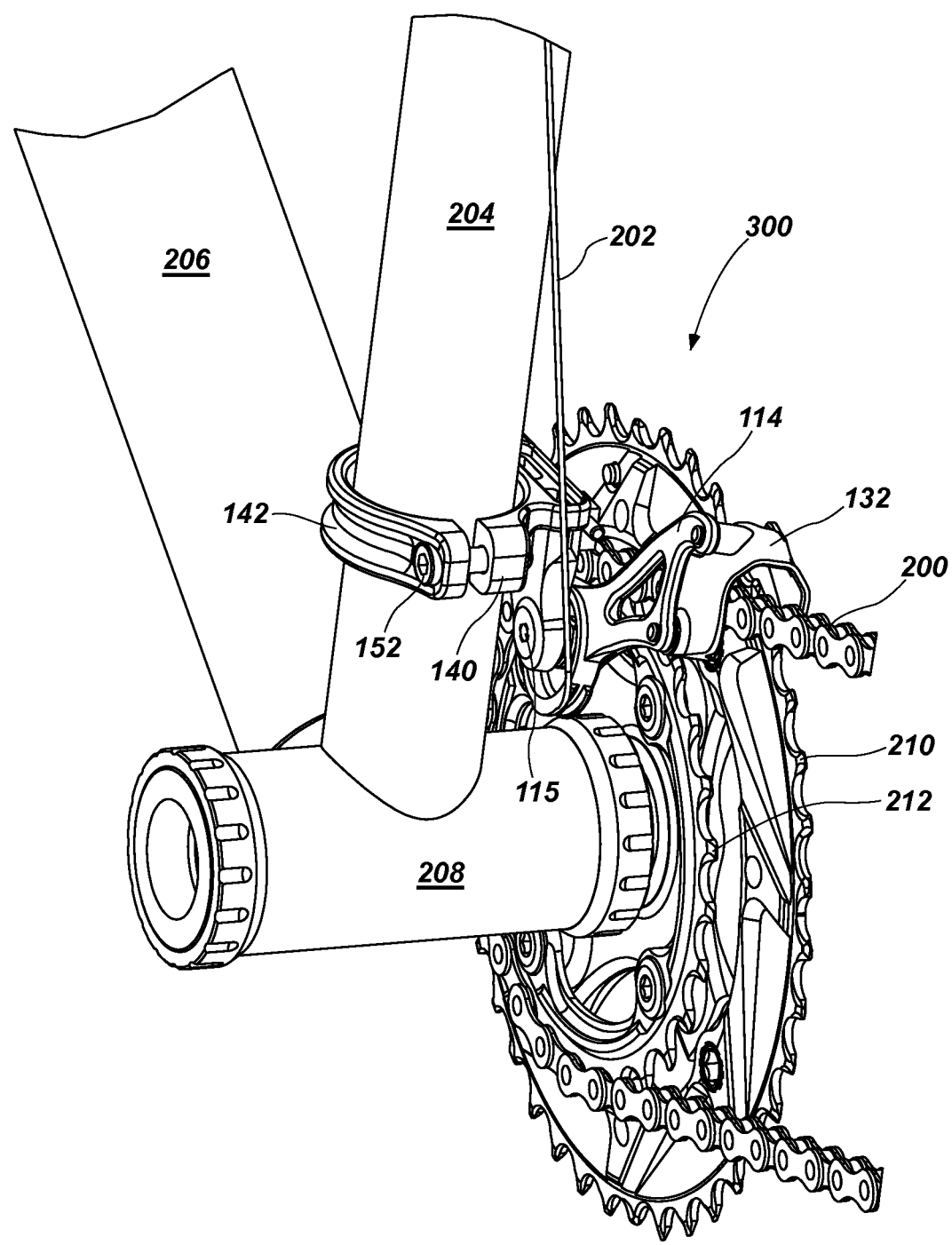
FIG. 22 is a rear perspective view of the single pivot front derailleur featuring the second preferred chain guide shown in FIGS. 20-21 showing how the derailleur and chain guide interact with the other bicycle components.

FIG. 22 is a rear perspective view of the second embodiment of a single pivot front derailleur 300. Derailleur 300 features the second preferred chain guide 132 shown in FIGS. 20-21. FIG. 22 shows how the derailleur 300 and chain guide 132 interact with the other bicycle components in a manner analogous to FIG. 18. Note that because of the open cage feature of chain guide 132, it can track the perimeter of the large and small chainrings 210 and 212 more closely than conventional closed annulus chain guides.

Figure 23:
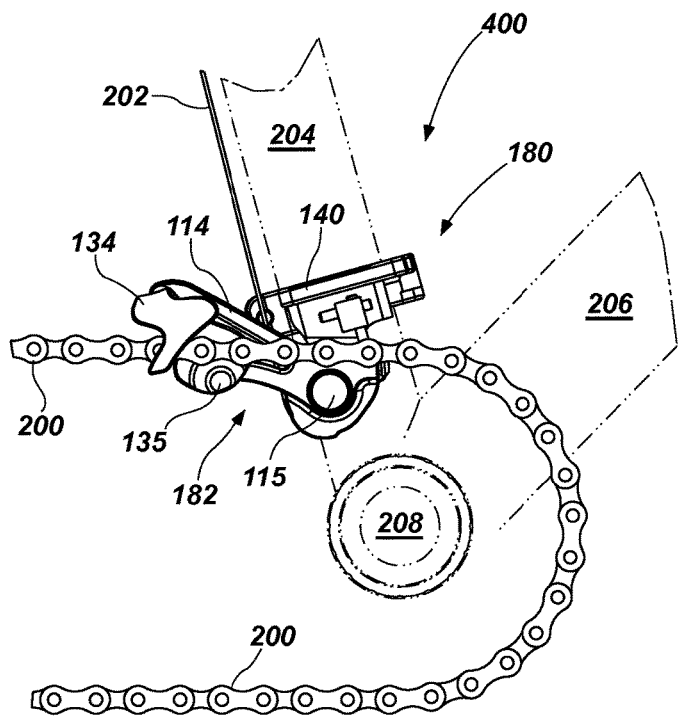
FIGS. 23-24 are right side views illustrating yet another embodiment of a single pivot front derailleur featuring a third preferred chain guide and without the optional dual-sided chain catcher. More particularly.
Figure 24:
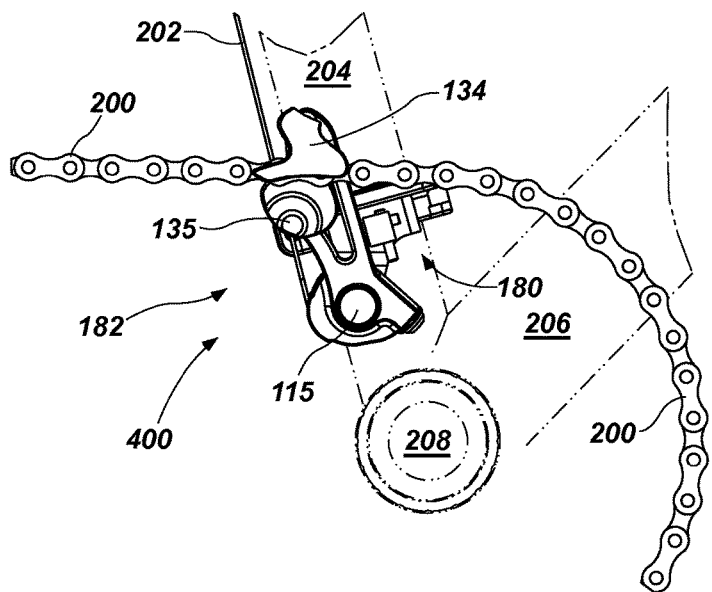

FIGS. 23-24 are right side views illustrating a third embodiment of a single pivot front derailleur 400 featuring a third preferred chain guide 134 and without the optional dual-sided chain catcher 170. More particularly, FIG. 23 shows the derailleur 400 in the low shift position, i.e., with the bicycle chain 200 running on a small chainring 212 (not shown). Similarly, FIG. 24 shows the derailleur 400 in the high shift position, i.e., with bicycle chain 200 running on a large chainring 210 (also not shown).

The configuration of the third preferred chain guide 134 is of an open cage design similar to the second preferred chain guide 132. This open cage feature allows easier servicing of the front derailleur 400 by not requiring breaking the chain 200 to remove or install derailleur 400. The third preferred chain guide 134 also includes a truncated lifting cone 135 feature similar to cone 133 of the second preferred chain guide 132. Truncated lifting cone 135 also forms an outwardly tapered surface used to lift and bias the bicycle chain 200 toward the large chainring 210 during an up-shift. The raised portion and angle of action of the truncated lifting cone 135 also persists even as the third preferred chain guide 134 and movement mechanism 182 rotate about single pivot 104 and axis 115 during an up-shift. The shape and angle of the truncated lifting cone 135 are carefully selected to obtain direct and quick action promoting the up-shift. The function of truncated lifting cone 135 is analogous to the function of saddle-like, angled lifting surface 131 of the first preferred chain guide 130 and cone 133 discussed above.

Figure 25:
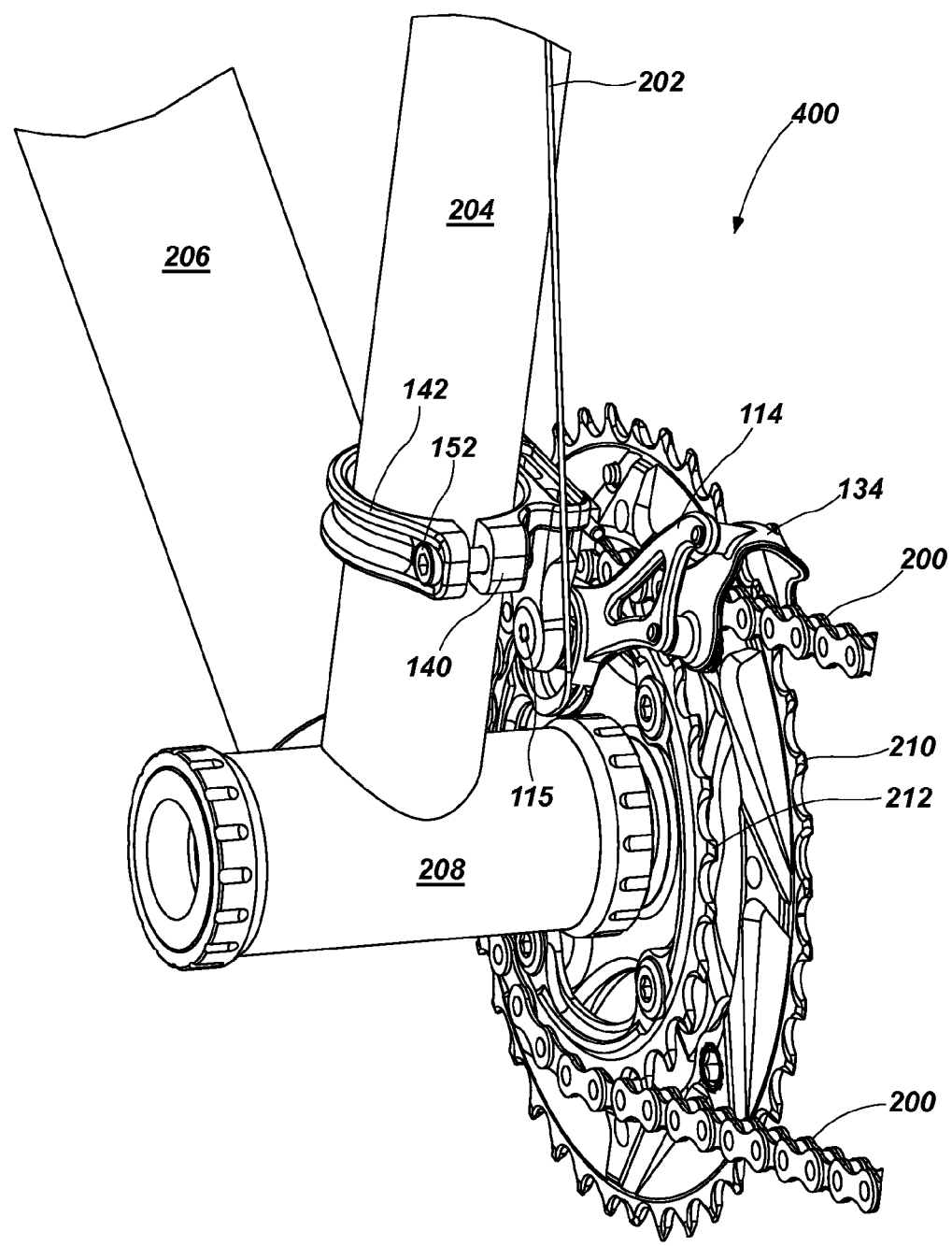
FIG. 25 is a rear perspective view of the single pivot front derailleur featuring the third preferred chain guide shown in FIGS. 23-24 showing how the derailleur and chain guide interact with the other bicycle components.

FIG. 25 is a rear perspective view of the third embodiment of a single pivot front derailleur 400 featuring the third preferred chain guide 134 shown in FIGS. 23-24. FIG. 25 illustrates how the derailleur 400 and chain guide 134 interact with the other bicycle components in a manner analogous to FIGS. 18 and 22. Like chain guide 132, the open cage feature of chain guide 134 can track the perimeter of the large and small chainrings 210 and 212 more closely than conventional closed annulus chain guides.

Figure 26:
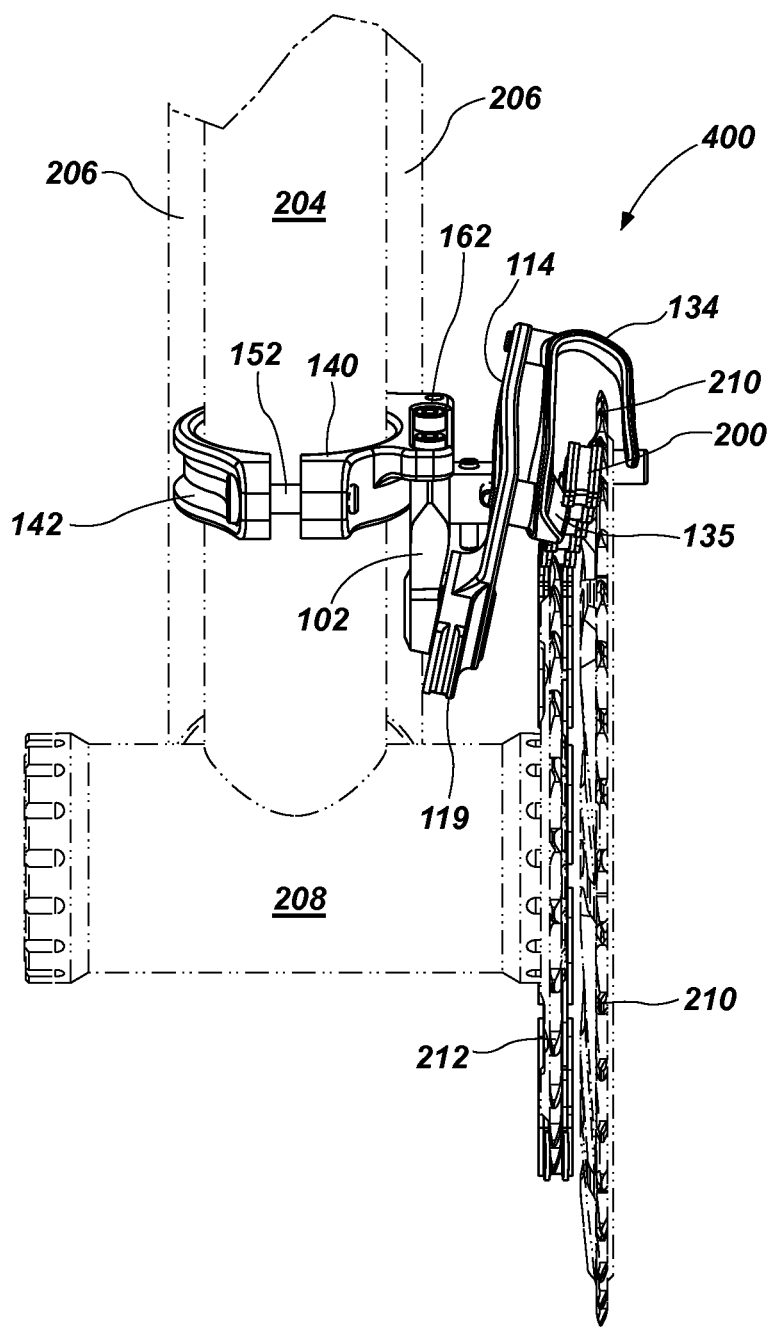
FIG. 26 is a rear view of the embodiment of a third embodiment of a single pivot front derailleur featuring the third preferred chain guide illustrating a truncated lifting cone formed along the inner plate of the second preferred chain guide, the cone configured to lift the bicycle chain during an up-shift.

FIG. 26 is a rear view of the third embodiment of a single pivot front derailleur 400 featuring the third preferred chain guide 134 illustrating the truncated lifting cone 135 formed along the inner plate of the third preferred chain guide 134. The truncated lifting cone 135 is configured to lift the bicycle chain 200 during an up-shift. The view of derailleur 400 shown in FIG. 26 has been simplified to more clearly show some of its structural features. For example, the optional dual-sided chain catcher 170 and derailleur cable 202 are not shown in FIG. 26. FIG. 26 shows how the truncated lifting cone 135 feature interacts with the corner of the bicycle chain 200 during the up-shift. Because the cone 135 is round and conical, the angled action and consequent lifting effect is maintained even during rotation of arm 114. Once the bicycle chain 200 has cleared the inner surface of the teeth of the large chainring 210 and becomes centered over the large chainring 210, the bicycle chain 200 then slides off of cone 135 and drops into full engagement with the large chainring 210. This unique rotating lift and drop action achieved by all of the single pivot front derailleurs 100, 300, 400 disclosed herein cannot be achieved by conventional front derailleurs.

Figure 27:
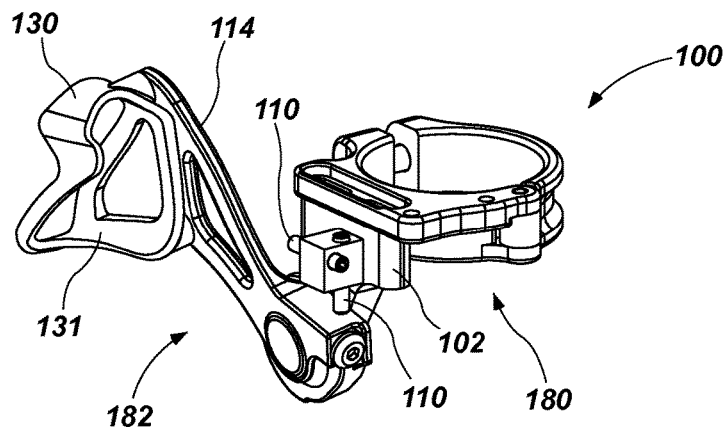
FIG. 27 is a front perspective view of the embodiment of the single pivot front derailleur shown in FIGS. 1-19 in the low shift position.
Figure 28:
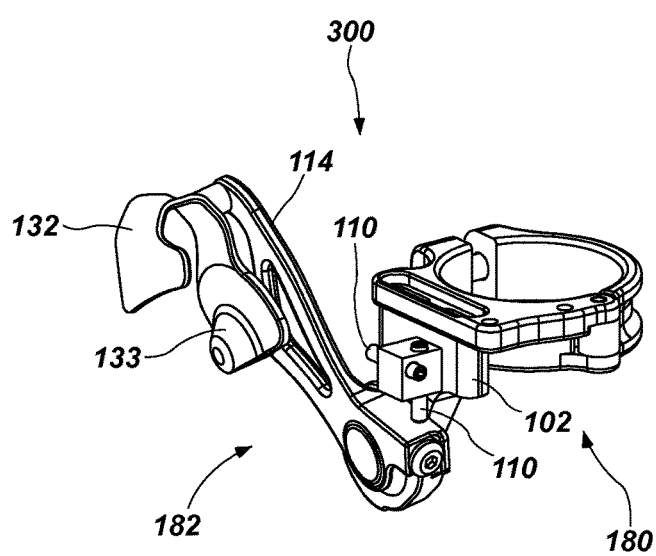
FIG. 28 is a front perspective view of the embodiment of the single pivot front derailleur featuring the second preferred chain guide shown in FIGS. 20-22 in the low shift position.
Figure 29:
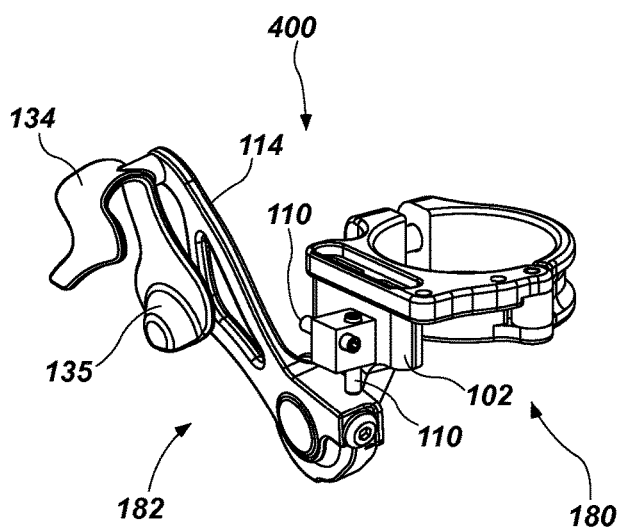
FIG. 29 is a front perspective view of the embodiment of the single pivot front derailleur featuring the third preferred chain guide shown in FIGS. 23-25 in the low shift position.

FIGS. 27-29 allow direct comparison of the distinctive chain guides 130, 132 and 134 of the embodiments of the front derailleur 100, 300 and 400, respectively. FIGS. 27-29 also illustrate stop screws 110 (two shown) positioned in the pivot bulkhead 102. The stop screws 110 provide limits on the rotation of the movement mechanism 182, particularly arm 114.

More specifically, FIG. 27 illustrates a front perspective view of the embodiment of the single pivot front derailleur 100 shown in FIGS. 1-19 in the low shift position. Note again that first preferred chain guide 130 has a closed annulus for surrounding the bicycle chain 200 (not shown). The saddle-like, angled lifting surface 131 is formed on the inner lower surface of chain guide 130.

FIG. 28 is a front perspective view of the embodiment of the single pivot front derailleur 300 featuring the second preferred chain guide 132 shown in FIGS. 20-22 in the low shift position. As shown in FIG. 28, the inside lower surface of the second preferred chain guide 132 includes a truncated lifting cone 133 used to lift the bicycle chain 200 (not shown) during up-shifts.

FIG. 29 is a front perspective view of the embodiment of the single pivot front derailleur 400 featuring the third preferred chain guide 134 shown in FIGS. 23-25 in the low shift position. As shown in FIG. 29, the inside lower surface of the second preferred chain guide 134 also includes a truncated lifting cone 135 used to lift the bicycle chain 200 (not shown) during up-shifts.

Figure 30:
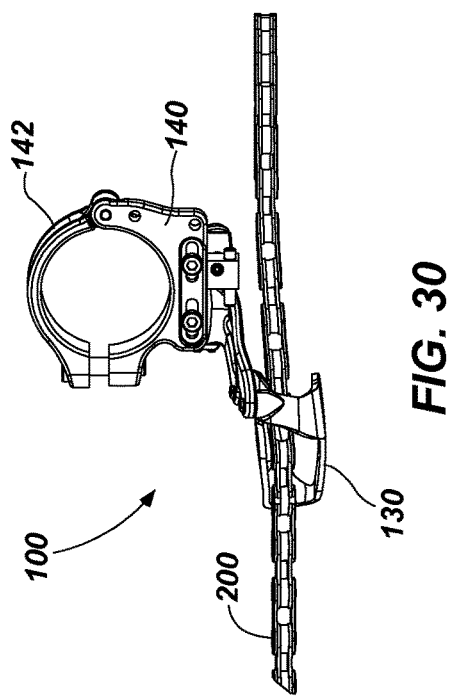
FIG. 30 is a top view of the embodiment of a single pivot front derailleur featuring the first preferred chain guide acting upon a bicycle chain during an up-shift, according to the present invention.

FIG. 30 is a top view of the first embodiment of a single pivot front derailleur 100 featuring the first preferred chain guide 130 acting upon a bicycle chain 200 during an up-shift, according to the present invention. More particularly, the bicycle chain 200 is moving from right to left in FIG. 30 and from the small chainring 212 (not shown) toward the large chainring 210 (not shown).

Figure 31:
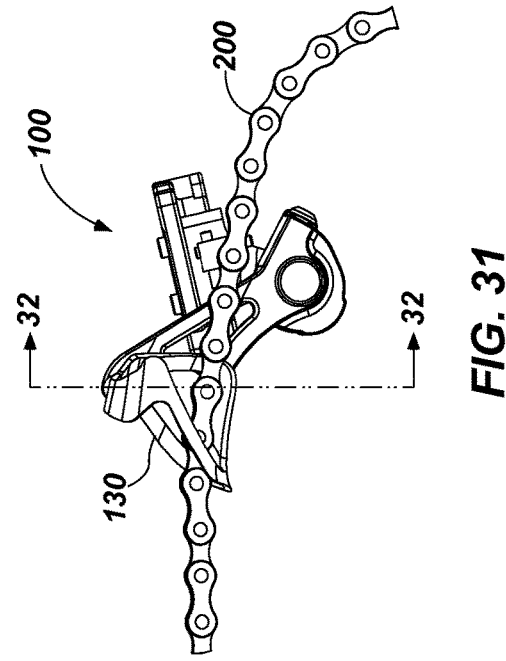
FIG. 31 is a right side view of the embodiment of a single pivot front derailleur shown in FIG. 30 indicating the cross-section shown in FIG. 32.
Figure 32:
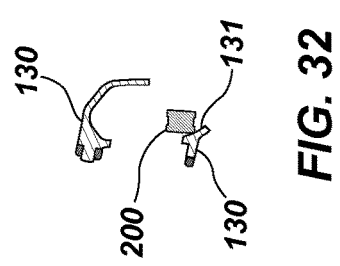
FIG. 32 is a cross-sectional view through the first preferred chain guide and bicycle chain as shown in FIG. 31 illustrating the angled lifting surface engaging the bicycle chain during an up-shift.

FIG. 31 is a right side view of the embodiment of a single pivot front derailleur 100 shown in FIG. 30 indicating the cross-section shown in FIG. 32. Note that the view in FIG. 31 is orthogonal to the view in FIG. 30. Note that in FIGS. 30-31, the bicycle chainrings 210 and 212 are invisible even though the chain 200 is shown riding on the invisible chainrings 210 and 212.

FIG. 32 is a cross-sectional view through the first preferred chain guide 130 and bicycle chain 200 as shown in FIG. 31 illustrating the angled lifting surface 131 acting upon, or engaging, the bicycle chain 200 during an up-shift. Note in contrast that conventional front derailleurs tend to have generally flat and vertical inside plate surfaces.

Figure 34:
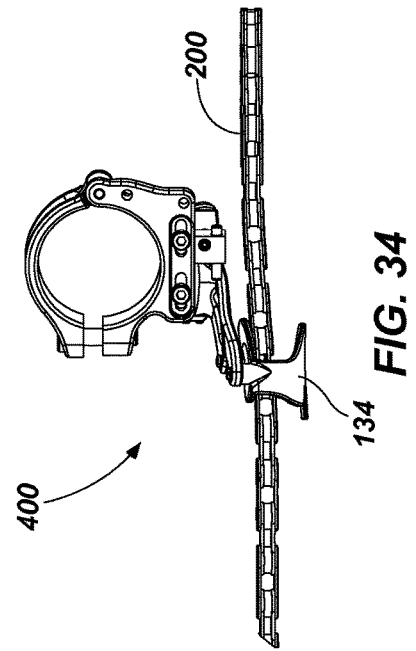
FIG. 34 is a top view of the embodiment of the single pivot front derailleur shown in FIG. 33.
Figure 33:
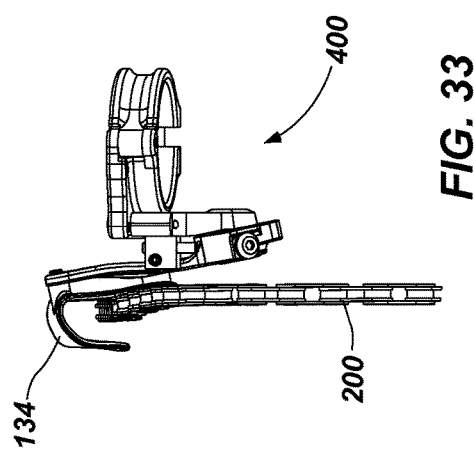
FIG. 33 is a front view of the embodiment of a single pivot front derailleur featuring an embodiment of the third preferred chain guide acting upon a bicycle chain during an up-shift, according to the present invention.

FIGS. 33-36 illustrate further detail of the third preferred embodiment of chain guide 134 featured in the third embodiment of the single pivot front derailleur 400. More particularly, FIG. 33 illustrates a front view of the third embodiment of a single pivot front derailleur 400 featuring an embodiment of the third preferred chain guide 134 acting upon a bicycle chain 200 during an up-shift, according to the present invention. FIG. 34 is a top view of the first embodiment of the single pivot front derailleur 400 shown in FIG. 33. More particularly, the bicycle chain 200 is moving from right to left in FIG. 34 and from the small chainring 212 (not shown) toward the large chainring 210 (not shown).

Figure 36:
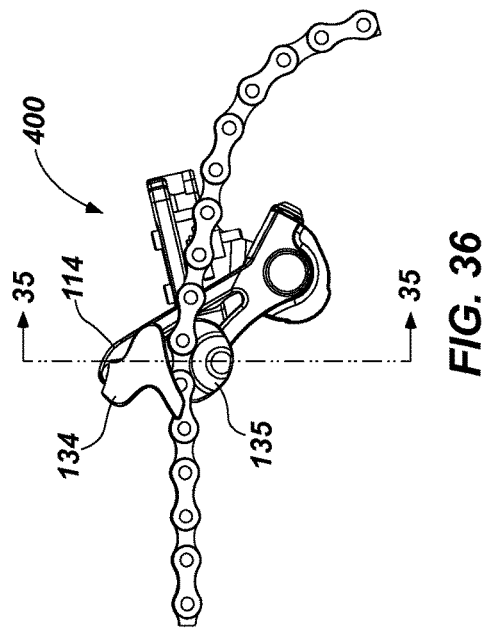
FIG. 36 is a right side view of the single pivot front derailleur shown in FIGS. 33-34 indicating the location of the section view shown in FIG. 35.

From FIGS. 33 and 34 it is evident that the inside surface of the chain guide 134 is acting upon and bending the bicycle chain 200 during the up-shift. FIG. 36 is a right side view of the third embodiment of a single pivot front derailleur 400 shown in FIGS. 33-34 indicating the location of the section view shown in FIG. 35. Note that in FIGS. 33, 34 and 36, the bicycle chainrings 210 and 212 are invisible even though the chain 200 is shown riding on the invisible chainrings 210 and 212.

Figure 35:
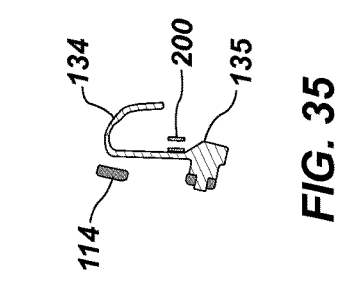
FIG. 35 is a cross-sectional view through the third preferred chain guide of FIGS. 33-34 as indicated in FIG. 36.

FIG. 35 illustrates a cross-sectional view through the third preferred chain guide 134 shown in FIGS. 33-34 as indicated in FIG. 36. The bicycle chain cross-section is of two inner plates shown shaded just above the truncated lifting cone 135. A corresponding cross-section through the second preferred chain guide 132 would have a similar appearance with regard to the truncated lifting cone 133. The truncated lifting cone 135 has an angled action surface for engaging a corner of the bicycle chain 200. This configuration is in contrast to conventional front derailleurs that tend to have generally flat and vertical inside plate surfaces.

Figure 38:
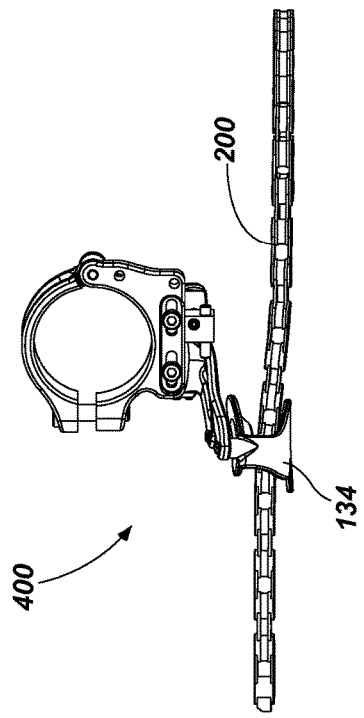
FIG. 38 is a top view of the embodiment of the single pivot front derailleur shown in FIG. 37.
Figure 37:
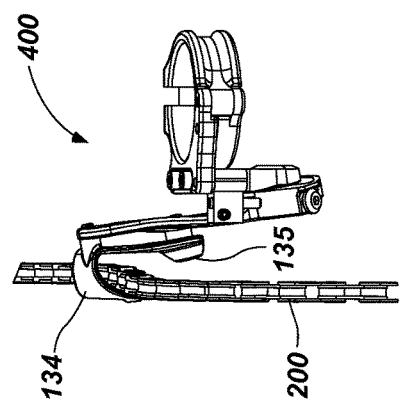
FIG. 37 is a front view of an embodiment of a single pivot front derailleur featuring an embodiment of the third preferred chain guide acting upon a bicycle chain during a down-shift, according to the present invention.
Figure 40:
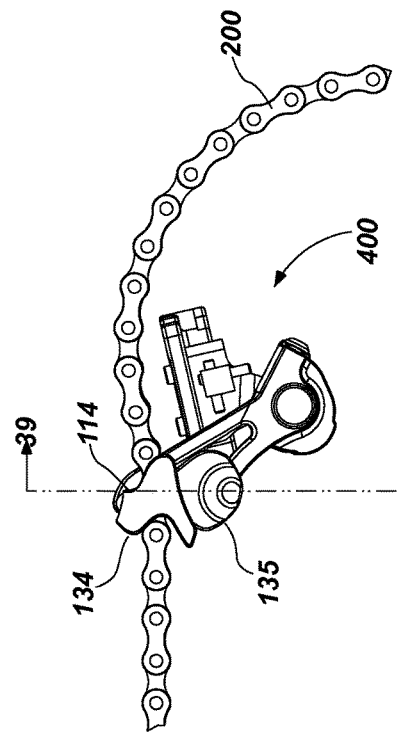
FIG. 40 is a right side view of the single pivot front derailleur shown in FIGS. 37-38 indicating the location of the section view shown in FIG. 39.

Up until this point in the detailed description, the discussion has focused on the structural features and operation of the single pivot front derailleurs 100, 300 and 400 for performing an up-shift. However, the derailleurs 100, 300 and 400 have novel features for achieving fast down-shifts as well. FIGS. 37-40 illustrate how the derailleurs 100, 300 and 400 achieve a fast down-shift that actually pulls down on the bicycle chain 200 during a down-shift More particularly, FIG. 37 is a front view of the third embodiment of a single pivot front derailleur 400 featuring an embodiment of the third preferred chain guide 134 acting upon a bicycle chain 200 during a down-shift, according to the present invention. FIG. 38 is a top view of the third embodiment of the single pivot front derailleur 400 shown in FIG. 37. More particularly, the bicycle chain 200 is moving from right to left in FIG. 38 and from the large chainring 210 (not shown) toward the small chainring 212 (not shown). FIGS. 37 and 38 show that the third preferred chain guide 134 laterally bends the bicycle chain 200 during a down-shift FIG. 40 illustrates a right side view of the third embodiment of a single pivot front derailleur 400 shown in FIGS. 37-38 indicating the location of the section view shown in FIG. 39. The curved portion of the bicycle chain 200 shown in FIG. 40 is supported on a large chainring 210 (not shown). The portion of the bicycle chain 200 shown to the left side of chain guide 134 is under tension rotating a rear gear in a cassette or gear cluster of the rear wheel (not shown). Note that this portion of the chain 200 is below the portion to the right of the chain guide 134 because it is being pulled down at the angled outer pulling surface 136 (see FIG. 39 and discussion below) of chain guide 134.

Figure 39:
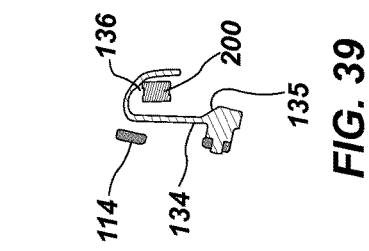
FIG. 39 is a cross-sectional view through the third preferred chain guide of FIGS. 37-38 as indicated in FIG. 40.

Finally, FIG. 39 illustrates the cross-sectional view through the third preferred chain guide 134 of FIGS. 37-38 as indicated in FIG. 40. The cross-section of the third preferred chain guide 134 illustrates the angled outer pulling surface 136 acting upon the upper right corner of bicycle chain 200. The cross-section shown in FIG. 39 illustrates the cross-section of the bicycle chain 200 and the portion of arm 114 as both shaded. It is this unique angled outer pulling surface 136 acting upon the upper right corner of bicycle chain 200 that gives derailleur 400 its fast down-shifting performance. It will be understood that similar angled outer pulling surfaces are found in chain guides 130 and 132.

In the embodiments of derailleur 100, 300 and 400 shown in the drawings, the arm 114 is shown biased toward the low shifting position via return spring 112 in a top pull configuration. It will be understood that in other embodiments of the single pivot front derailleur (not shown), the return spring could be biased in the opposite direction, i.e., a bottom pull configuration for an equivalent mechanical operation.

It will also be understood that while the truncated lifting cone features 133 and 135 are shown on the open cage chain guides 132 and 134, respectively, such a feature is not limited to open cage chain guides and could be applied to a closed annulus chain guide similar to the first preferred chain guide 130. Similarly, the saddle-like, angled lifting surface 131 could be applied in the context of an open cage chain guide in other embodiments not shown.

In fact, one of ordinary skill in the art, using this written description, should be able to practice all variations of pull type configurations. Accordingly, all such pull types are considered to be within the scope of the present invention. Similarly, the mounting mechanism shown in all of the drawings is of the clamp type. One of ordinary skill in the art, using this written description, should be able to practice all variations of mounting types, e.g., braze-on, E-type, DMD, etc. Accordingly, all such mounting mechanisms are considered to be within the scope of the present invention.

The materials from which the single pivot front derailleurs 100, 300 and 400 are constructed include suitable light-weight alloy metals, e.g., aluminum, titanium, stainless steel, or carbon composite materials.

The following detailed description are further general embodiments of the single pivot front derailleur that may or may not correspond precisely with drawings and the nomenclature used to describe the components and features in the drawings, but are nonetheless additional variations on the inventive concepts disclosed herein.

An embodiment of a single pivot front derailleur for shifting a bicycle chain between a small chainring and a large chainring is disclosed. The embodiment of a front derailleur may include a mounting mechanism for structurally securing the front derailleur to a bicycle frame. The mounting member may be a pair of hinged clamps 140 and 142 as disclosed herein. The connection to the bicycle frame is typically through a structural member, e.g., a seat tube 204 as disclosed herein. The embodiment of a front derailleur may further include an embodiment of a movement mechanism connected to the mounting mechanism. The embodiment of a movement mechanism may further include an arm having a proximal end housing a single pivot. The arm may be configured to rotate about a single pivot in a plane of rotation. The plane of rotation may be at an acute angle relative to any vertical plane of the bicycle frame. For example, where there are seat 204 and down tubes 206, the axis of each of the seat 204 and down tube 206 will lie in a vertical plane relative to the bicycle frame. In another example, if one were to slice the frame in half to create left and right sides of the bicycle frame itself or the entire bicycle, this would be such a vertical plane of the bicycle frame for referencing the acute angle, a. The embodiment of a movement mechanism may further include a chain guide connected to a distal end of the arm. The chain guide may be configured for lifting up or pulling down on the bicycle chain during shifting.

According to another embodiment, the front derailleur may further comprise a dual-sided chain catcher adjustably connected to the mounting mechanism with an inner guard and an outer guard cantilevered and overlapping the chainrings and the bicycle chain to prevent unintended over-shoot of the bicycle chain during shifting. According to yet another embodiment, the chain guide may include an annular cage completely enclosing the bicycle chain, having a lower inner saddle-like angled lifting surface configured for lifting the bicycle chain from a low position on the small chainring to a high position on the large chainring during an up-shift. According to still another embodiment, the chain guide may include an open cage partially enclosing the bicycle chain, the open cage having a truncated lifting cone surface extending outward, the truncated lifting cone surface configured for lifting the bicycle chain from a low position on the small chainring to a high position on the large chainring during an up-shift.

An embodiment of a single pivot front derailleur for shifting a bicycle chain between a small chainring and a large chainring is disclosed. The embodiment of a front derailleur may include a mounting mechanism for securing the front derailleur to a bicycle frame structural member. The mounting member may again be a pair of hinged clamps 140 and 142 as disclosed herein. The bicycle frame structural member may also be a seat tube 204 as disclosed herein. The embodiment of a front derailleur may further include an arm rotationally connected to the mounting mechanism through a single pivot located at a proximal end. The embodiment of a front derailleur may further include a chain guide connected to a distal end of the arm. The chain guide and arm may be configured to selectively rotate about the single pivot in a direction forward or backward relative to the mounting mechanism during shifting.

According to another embodiment, the chain guide may include an annular chain guide or cage completely enclosing the bicycle chain. According to this embodiment, the annular cage may have a lower inner saddle-like angled lifting surface configured for lifting the bicycle chain from a low position on the small chainring to a high position on the large chainring during an up-shift. According to another embodiment, the annular cage may further include an angled outer pulling surface formed therein configured for pulling the bicycle chain down to the low position on the small chainring from the high position on the large chainring during a down-shift.

According to yet another embodiment, the chain guide may include an open cage partially enclosing the bicycle chain. The embodiment of an open cage may further include a truncated lifting cone surface extending outward from an inner surface. The embodiment of a truncated lifting cone surface may be configured for lifting the bicycle chain from a low position on the small chainring to a high position on the large chainring during an up-shift. According to still another embodiment, the arm rotates about the single pivot in a plane of rotation. The plane of rotation may be at an acute angle relative to another plane including a seat tube axis and a down tube axis.

According to one embodiment, the front derailleur may further include a dual-sided chain catcher adjustably connected to the mounting mechanism with an inner guard and an outer guard cantilevered and overlapping the chainrings and the bicycle chain to prevent unintended over-shoot of the bicycle chain during shifting. According to another embodiment, the front derailleur may further include a pivot bulkhead adjustably connected to the mounting mechanism. The pivot bulkhead may house the single pivot to which the arm is rotationally connected. According to yet another embodiment, the mounting mechanism may include an inner clamp 140 and an outer clamp 142 secured by a mounting bolt 152, as shown herein. According to still another embodiment, the bicycle frame structural member may be a seat tube 204 as shown herein.

An embodiment of a front derailleur for shifting a bicycle chain between a small chainring and a large chainring is disclosed. The embodiment of a front derailleur may include a chain guide having a saddle-shaped lifting surface (see, e.g., 131 as described herein) and an angled outer pulling surface (see, e.g., 136 as described herein) for engaging the bicycle chain during up-shifts and down-shifts, respectively. The embodiment of a front derailleur may further include an arm connected at a distal end to the chain guide. The arm may house a single pivot about which the distal end and chain guide rotate about. The embodiment of a front derailleur may further include a mounting mechanism rotationally connected to the arm through the single pivot.

According to one embodiment, the mounting mechanism may be adjustably attached to a bicycle frame structural member. According to a particular embodiment, the bicycle frame structural member may be a seat tube 204. According to another embodiment, the chain guide may rotate forward and upward about the single pivot during an up-shift. The relative terms forward and upward are both being referenced relative to the rider on the bicycle. According to yet another embodiment, the chain guide may rotate backward and downward about the single pivot during a down-shift. According to still another embodiment, the chain guide may include an open cage allowing installation, removal and servicing of the front derailleur without breaking the bicycle chain.

According to one embodiment, the front derailleur may further include an optional dual-sided chain catcher (see, e.g., 170 as disclosed herein) adjustably connected to the mounting mechanism with an inner guard 178 and an outer guard 176, the inner guard 176 preventing the bicycle chain from falling inside the small chainring 212 during down-shifts and the outer guard 176 preventing the bicycle chain 200 from falling outside the large chainring 210 during up-shifts.

It will be understood that the optional dual-sided chain catcher 170 disclosed herein is not limited to any particular type of movement mechanism, such as the single pivot movements of the front derailleurs shown herein. Accordingly, an embodiment of a dual-sided chain catcher 170 adjustably connected to a structural member of a bicycle frame is disclosed. This structural member could be any suitable structural member, e.g., a seat tube 204 or a chainstay (not shown). Furthermore this embodiment of a dual-sided chain catcher may, or may not be attached to a mounting mechanism of any type of front derailleur, not just the single pivot front derailleurs disclosed herein. Thus, it will be understood that the dual-sided chain catcher design and concept disclosed herein is believed to be novel and nonobvious all by itself and does not require any particular attachment mechanism or association with a front derailleur. The embodiment of the dual-sided chain catcher (e.g., 170) may include an inner guard (e.g., 178) and an outer guard (e.g., 176). The inner guard (e.g., 178) may prevent the bicycle chain 200 from falling inside the small chainring 212 during down-shifts. The outer guard (e.g., 176) may prevent the bicycle chain 200 from falling outside the large chainring 210 during up-shifts.

In understanding the scope of the present invention, the term "configured" as used herein to describe a component, section or part of a device includes structural elements that are constructed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of bicycle equipped with the present invention. Accordingly, these terms, as utilized to describe the present invention should be interpreted relative to a bicycle equipped with the present invention as used in the normal riding position as viewed by the rider. Finally, terms of degree such as "substantially", "about" and "approximately" if used herein mean a reasonable amount of deviation of the modified term such that the end result is not significantly changed.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A single pivot front derailleur for shifting a bicycle chain between a small chainring and a large chainring, the front derailleur comprising:
    a mounting mechanism for structurally securing the front derailleur to a bicycle frame; and
    a movement mechanism connected to the mounting mechanism, wherein
    the movement mechanism comprises an arm having a proximal end housing a single pivot and a chain guide connected to a distal end of the arm,
    the arm and chain guide rotate about the single pivot in a plane of rotation,
    the plane of rotation is at an acute angle relative to a vertical plane of the bicycle frame, and
    the chain guide is configured for lifting up or pulling down on the bicycle chain during shifting.

2. A single pivot front derailleur for shifting a bicycle chain between a small chainring and a large chainring, the front derailleur comprising:
    a mounting mechanism for structurally securing the front derailleur to a bicycle frame;
    a movement mechanism connected to the mounting mechanism, the movement mechanism comprising:
    an arm having a proximal end housing a single pivot, the arm rotating about the single pivot in a plane of rotation, the plane of rotation at an acute angle relative to a vertical plane of the bicycle frame; and
    a chain guide connected to a distal end of the arm, the chain guide configured for lifting up or pulling down on the bicycle chain during shifting, further comprising a dual-sided chain catcher adjustably connected to the mounting mechanism with an inner guard and an outer guard cantilevered and overlapping the chainrings and the bicycle chain to prevent unintended over-shoot of the bicycle chain during shifting.

3. The front derailleur according to claim 1, wherein the chain guide comprises an annular cage completely enclosing the bicycle chain, having a lower inner saddle-like angled lifting surface configured for lifting the bicycle chain from a low position on the small chainring to a high position on the large chainring during an up-shift.

4. The front derailleur according to claim 1, wherein the chain guide comprises an open cage partially enclosing the bicycle chain, the open cage having a truncated lifting cone surface extending outward, the truncated lifting cone surface configured for lifting the bicycle chain from a low position on the small chainring to a high position on the large chainring during an up-shift.

5. A single pivot front derailleur for shifting a bicycle chain between a small chainring and a large chainring, the front derailleur comprising:
    a mounting mechanism for securing the front derailleur to a bicycle frame structural member;
    an arm rotationally connected to the mounting mechanism through a single pivot located at a proximal end; and
    a chain guide connected to a distal end of the arm, the chain guide and arm configured to selectively rotate about the single pivot in a direction forward or backward relative to the mounting mechanism during shifting.

6. The front derailleur according to claim 5, wherein the chain guide comprises an annular cage completely enclosing the bicycle chain, the annular cage having a lower inner saddle-like angled lifting surface configured for lifting the bicycle chain from a low position on the small chainring to a high position on the large chainring during an up-shift.

7. The front derailleur according to claim 6, wherein the annular cage further comprises an angled outer pulling surface formed therein configured for pulling the bicycle chain down to the low position on the small chainring from the high position on the large chainring during a down-shift.

8. The front derailleur according to claim 5, wherein the chain guide comprises an open cage partially enclosing the bicycle chain, the open cage having a truncated lifting cone surface extending outward from an inner surface, the truncated lifting cone surface configured for lifting the bicycle chain from a low position on the small chainring to a high position on the large chainring during an up-shift.

9. The front derailleur according to claim 5, wherein the arm rotates about the single pivot in a plane of rotation, the plane of rotation at an acute angle relative to another plane passing vertically through the bicycle dividing it into left and right halves.

10. The front derailleur according to claim 5, further comprising a dual-sided chain catcher adjustably connected to the mounting mechanism with an inner guard and an outer guard cantilevered and overlapping the chainrings and the bicycle chain to prevent unintended over-shoot of the bicycle chain during shifting.

11. The front derailleur according to claim 5, further comprising a pivot bulkhead adjustably connected to the mounting mechanism, the pivot bulkhead including the single pivot to which the arm is rotationally connected.

12. The front derailleur according to claim 5, wherein the mounting mechanism comprises an inner clamp and an outer clamp secured by a mounting bolt.

13. The front derailleur according to claim 5, wherein the bicycle frame structural member comprises a seat tube.

14. A front derailleur for shifting a bicycle chain between a small chainring and a large chainring, the front derailleur, comprising:
    a chain guide having an upwardly and outwardly angled and contoured lifting surface and an inwardly and downwardly angled outer pulling surface for engaging the bicycle chain during up-shifts and down-shifts, respectively;
    an arm connected at a distal end to the chain guide, the arm housing a pivot axis about which the distal end and the chain guide rotate about; and
    a mounting mechanism rotationally connected to the arm through a single pivot housing the pivot axis.

15. The front derailleur according to claim 14, wherein the mounting mechanism is adjustably attached to a bicycle frame structural member.

16. The front derailleur according to claim 15, wherein the bicycle frame structural member comprises a seat tube.

17. The front derailleur according to claim 14, wherein the chain guide rotates forward and upward about the single pivot during an up-shift.

18. The front derailleur according to claim 14, wherein the chain guide rotates backward and downward about the single pivot during a down-shift.

19. The front derailleur according to claim 14, wherein the chain guide comprises an open cage allowing installation, removal and servicing of the front derailleur without breaking the bicycle chain.

20. The front derailleur according to claim 14, further comprising an optional dual-sided chain catcher adjustably connected to the mounting mechanism with an inner guard and an outer guard, the inner guard preventing the bicycle chain from falling inside the small chainring during down-shifts and the outer guard preventing the bicycle chain from falling outside the large chainring during up-shifts.

21. A dual-sided chain catcher adjustably connected to a structural member of a bicycle frame of a bicycle having a front derailleur, the dual-sided chain catcher comprising an inner guard and an outer guard connected to one another over a top of a crankset of the bicycle comprising a small chainring and a large chainring, wherein the inner guard is positioned to prevent a bicycle chain from falling inside the small chainring during down-shifts by the front derailleur, and the outer guard is positioned to prevent the bicycle chain from falling outside the large chainring during up-shifts by the front derailleur.

22. A single pivot front derailleur for shifting a bicycle chain between a small chainring and a large chainring of a bicycle, the front derailleur comprising:

a mounting mechanism for structurally securing the front derailleur to a frame of the bicycle; and a movement mechanism comprising an arm having a proximal end housing a single pivot and a distal end connected to a chain guide, wherein the arm and chain guide pivot around the single pivot in a plane of rotation that is at an acute angle relative to planes of rotation of the chainrings, and the chain guide lifts the chain up or pulls the chain down during shifting.

* * * * *